United States Patent
Yang et al.

(10) Patent No.: US 11,936,407 B2
(45) Date of Patent: Mar. 19, 2024

(54) REDUNDANT TRANSMISSION FOR WIDEBAND RADIO SYSTEMS

(71) Applicant: APPLE INC., Cupertino, CA (US)

(72) Inventors: Weidong Yang, Cupertino, CA (US); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Jie Cui, Cupertino, CA (US); Manasa Raghavan, Cupertino, CA (US); Oghenekome Oteri, San Diego, CA (US); Seyed Ali Akbar Fakoorian, Cupertino, CA (US); Sigen Ye, Cupertino, CA (US); Wei Zeng, Cupertino, CA (US); Yang Tang, Cupertino, CA (US); Yingqun Yu, San Diego, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 317 days.

(21) Appl. No.: 17/593,696

(22) PCT Filed: Oct. 15, 2020

(86) PCT No.: PCT/CN2020/121277
§ 371 (c)(1),
(2) Date: Sep. 22, 2021

(87) PCT Pub. No.: WO2022/077378
PCT Pub. Date: Apr. 21, 2022

(65) Prior Publication Data
US 2022/0311457 A1    Sep. 29, 2022

(51) Int. Cl.
*H04B 1/00* (2006.01)
*H04L 5/00* (2006.01)
*H04W 72/23* (2023.01)

(52) U.S. Cl.
CPC ......... *H04B 1/0025* (2013.01); *H04B 1/0032* (2013.01); *H04L 5/0048* (2013.01); *H04W 72/23* (2023.01)

(58) Field of Classification Search
CPC ...... H04B 1/0025; H04B 1/0032; H04B 1/16; H04L 5/0048; H04W 72/23; H04W 52/0264; Y02D 30/70
(Continued)

(56) References Cited

U.S. PATENT DOCUMENTS 6,658,850 B1    12/2003    House et al.
2011/0194657 A1    8/2011    Han
(Continued)

FOREIGN PATENT DOCUMENTS

CN    101056295 A    10/2007
WO    2019201452 A1    10/2019

OTHER PUBLICATIONS

WIPO, International Search Report and Written Opinion, PCT/CN2020/121277, dated Jul. 15, 2021, 9 pages.
(Continued)

*Primary Examiner* — Eugene Yun
(74) *Attorney, Agent, or Firm* — Dorsey & Whitney LLP

(57) ABSTRACT

A communication system provides reliable wideband communications with reduced power consumption in a user equipment (UE) receiver. A UE may include receiver circuitry to receive a radio frequency (RF) signal from a wireless network and output an analog baseband signal. The RF signal includes M copies of a duplicated signal in a frequency domain. The analog baseband signal includes the
(Continued)

M copies of the duplicated signal uniformly offset from one another in the frequency domain by a bandwidth F and including a gap between adjacent copies. The UE further includes an anti-aliasing analog filter an analog to digital converter (ADC). The ADC samples an output of the anti-aliasing analog filter at a sampling frequency selected to obtain a digital baseband signal comprising a combined digital copy of the M copies of the duplicated signal folded over each other.

18 Claims, 13 Drawing Sheets

(58) Field of Classification Search
USPC .................................................. 455/552.1
See application file for complete search history.

(56) References Cited

U.S. PATENT DOCUMENTS

| 2014/0036984 | A1* | 2/2014 | Charbonneau | ...... H04L 25/0258 375/233 |
| 2017/0078024 | A1* | 3/2017 | Liu | ........................ H04B 10/27 |
| 2020/0204423 | A1* | 6/2020 | Atungsiri | ............ H04L 27/2613 |

OTHER PUBLICATIONS

Sequans Communications, "On PDCCH for URLLC", R1-1800798, 3GPP TSG RAN WG1 Meeting AH 1801, Vancouver, Canada, Agenda Item 7.3.1.5, Jan. 22-26, 2018, 4 pages.

Sony, "On potential complexity reduction techniques for NR devices", R1-2005580, 3GPP TSG RAN WG1 #102e, Agenda Item 8.6.1, Aug. 17-28, 2020, 4 pages.

Vivo, "Discussion on remaining details on synchronization signal", R1-1719756, 3GPP TSG RAN WG1 Meeting #91, Reno, Nevada, Agenda Item 7.1.1, Nov. 27-Dec. 1, 2017, 7 pages.

Zte et al.,"Considerations on initial access signals and channels for NR-U", R1-1903870, 3GPP TSG RAN WG1 Meeting #96bis, Xi'an, China, Agenda Item 7.2.2.1.1, Apr. 8-12, 2019, 20 pages.

* cited by examiner

US 11,936,407 B2

REDUNDANT TRANSMISSION FOR WIDEBAND RADIO SYSTEMS

TECHNICAL FIELD

This application relates generally to wireless communication systems, including wideband communication systems.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency hands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 2.4, 2.5 GHz to 52.6 GHz or beyond. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE, SEVERAL VIEWS OF THE DRAWINGS

To easily identify the discussion of any particular element or act, the most significant digit or digits in a reference number refer to the figure number in which that element is first introduced.

DETAILED DESCRIPTION

Some communication systems use links with wide bandwidths to provide high data rates. Example wideband systems may include controlled environments with unlicensed spectrum (e.g., 3GPP Release 17 (Rel-17) Ultra-Reliable and Low Latency Communications (URLLC)), millimeter systems where a channel occupancy rule and/or power spectrum density (PSD) requirement lead to wideband transmission (FR2, e.g., beyond 52.6 GHz)), and/or other wideband systems where spectrum is not in shortage. Unlicensed spectrum provides a cost-effective alternative to licensed spectrum. For example, unlicensed spectrum does not cost an operator to acquire the spectrum and implementation cost may be lower because an emission mask used with unlicensed spectrum can be more relaxed than that used for licensed spectrum. Further, URLLC can be useful in terms of creating a compelling user experience and may also provide new revenue sources. To achieve reliability, URLLC may use spectrum generously.

However, receiving signals over a large bandwidth can be challenging for UE implementation because it may use a large amount of power. Over wide bandwidths, an analog to digital converter (ADC) in a receiver may be a major source of power consumption. Accordingly, certain embodiments herein provide systems and methods for highly reliable wideband communications with reduced power consumption by the ADC in the receive chain.

Figure 1:
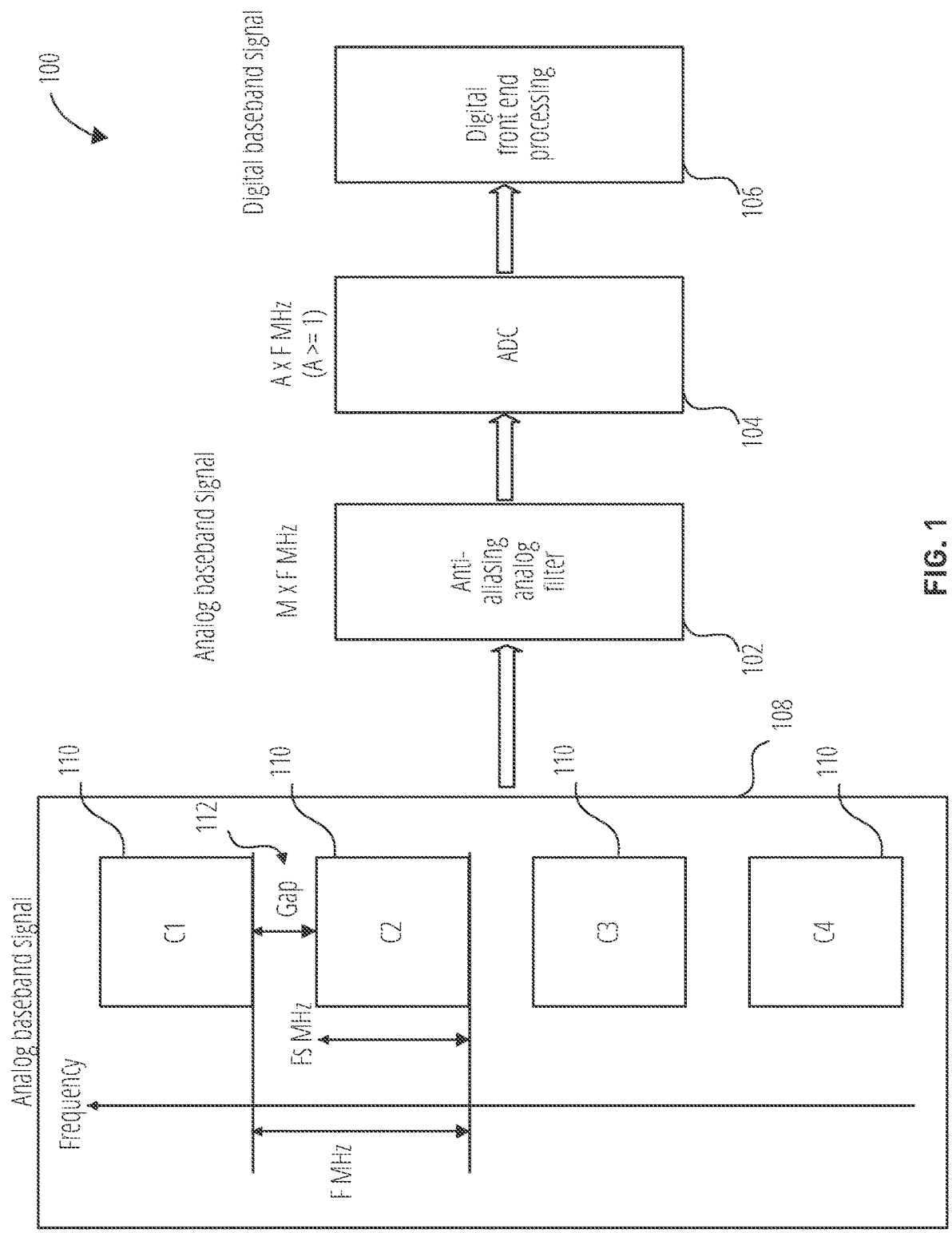
FIG. 1 is a block diagram illustrating UE, receiver components in accordance with one embodiment.

FIG. 1 is a block diagram illustrating UE receiver components 100 according to one embodiment. The UE receiver components 100 include an anti-aliasing analog filter 102, an ADC 104, and digital front end processing circuitry 106. The anti-aliasing analog filter 102 is configured to receive an analog baseband signal 108 that includes a signal or channel that is duplicated in the frequency domain. In this example, four copies of a duplicated signal 110 are used (shown as copies C1, C2, C3, and C4). Persons skilled in the art will recognize from the disclosure herein that fewer copies (including just two copies) or more than four copies may be used, depending on the particular application. For purposes of discussion herein, "M" represents the number of copies of the duplicated signal 110.

As shown in FIG. 1, the M copies of the duplicated signal 110 are offset from one another by a bandwidth "F" in the frequency domain. Thus, for example, the start of C1 is F megahertz (MHz) from the start of C2. Similarly, the start of C2 is F MHz from the start of C3, and the start of C3 is F MHz from the start of C4. Each copy of the duplicated signal 110 has a signal bandwidth "Fs" that occupies a portion of the bandwidth F such that there is a uniform gap 112 between adjacent copies of the duplicated signal 110. For illustrative purposes, F and Fs are shown and discussed as having units in MHz, which may correspond to the baseband of certain communication systems. However, the disclosure herein is not so limited and other units may also be used such as hertz (Hz), kilohertz (kHz), gigahertz (GHz), etc.

After radio frequency (RF) and intermediate frequency (IF) processing (see, e.g., FIG. 2), the analog baseband signal 108 is passed through the anti-aliasing analog filter 102. The anti-aliasing analog filter 102 may have a passband of, for example, M×F MHz (M multiplied by F) to attenuate or remove frequencies outside the lvi copies of the duplicated signal 110. The output of the anti-aliasing analog filter 102 is provided to the ADC 104. In a first mode of operation, to reduce power consumption, the ADC 104 is configured to sample at a rate of 2×F MHz (twice the value of F) or at a rate of A×F MHz, which is suitable to receive a signal with a maximum bandwidth at A×F MHz, where A≥1. In a second mode of operation, as discussed below, the ADC 104 may be configured to sample at a rate of B×M×F MHz (B times lvi times F), where B1≥1, which consumes more power than that consumed in the first mode but provides for higher data throughput (e.g., when the analog baseband signal 108 does not include duplication in the frequency domain, different signals/contents are sent over frequencies shown as being occupied by C1, C2, C3, and C4).

At the sampling rate of A×F MHz with A=1, aliasing is inevitable. However, the embodiments disclosed herein use aliasing to take advantage of the benefits of frequency diversity (using multiple widely spaced frequency channels to send the same message to reduce the effects of channel fading and interference) without paying the price (e.g. increased power consumption) of supporting a wideband radio. As the M copies of the duplicated signal 110 are folded over each other due to aliasing, the UE, receiver handles a low bandwidth signal instead of a large bandwidth signal for digital baseband processing. At the sampling rate of A×F MHz with A=2 and M=4, aliasing is inevitable; however it still allows the receiver to process at a lower rate than the full rate typically used to receive a signal with M×F MHz (B=1).

In certain embodiments, the ratio Fs/F is selected as a design parameter to increase transmission efficiency while still allowing for a low Q filter implementation at the UE, where "Q" is the quality factor associated with the width of the passband of the anti-aliasing analog filter 102. If the ratio Fs/F is too small, then the PSD limit may be underutilized (e.g., when operating over 50 MHz, if half of the spectrum is un-used, the transmitter may not be able to inject more power on the other part (occupied part) to recoup the loss. In certain implementations, this depends on regulation. Further, if the ratio Fs/F is too large, the design of the anti-aliasing analog filter 102 may be expensive or challenging to achieve a desired Q. Thus, the gap 112 may be based on a tradeoff between increasing the utilization of PSD of the analog baseband signal 108 (or RF signal) and reducing the complexity of the anti-aliasing analog filter 102, depending on the particular implementation.

Certain embodiments disclosed herein may be used with FR1 and/or FR2 transmissions from the base station. Other design considerations, according to certain embodiments discussed herein, address issues such as ADC sampling clock inaccuracy, spur handling, coherence loss, and ADC switch time. Regarding ADC sampling clock inaccuracy, for example, perfect or near perfect folding relies on the ADC sampling clock to be perfectly or near perfectly locked to the Tx sampling clock. If the ADC sampling clock is not sufficiently locked to the Tx sampling clock, then there may be a slight difference in the frequency domain alignment between different copies of the duplicated signal 110. If there is an ADC sampling clock inaccuracy, then each copy effectively may experience a small frequency offset difference. Thus, it is advantageous to reduce ADC sampling clock inaccuracy. Further, regarding spur handling, as the spur locations are known, spur handling can still easily be done with aliasing and the dynamic range of the ADC 104 is not negatively impacted when the sampling frequency is F MHz.

Figure 2:
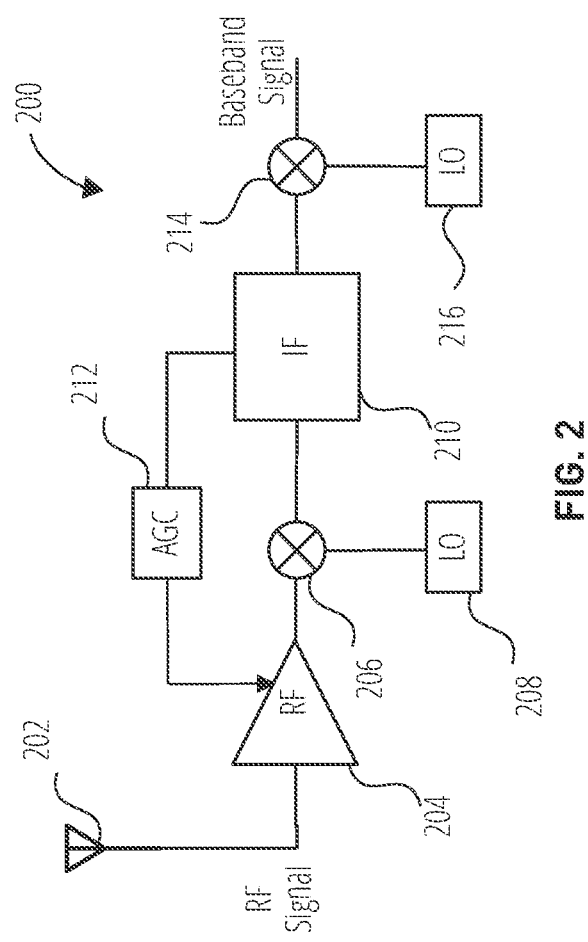
FIG. 2 is a simplified block diagram of receiver circuitry that may be used with certain embodiments herein.

FIG. 2 is a simplified block diagram of receiver circuitry 200 that may be used with certain embodiments herein. In this simplified example, the receiver circuitry 200 includes an antenna 202, an RF front end circuitry 204, a first mixer 206, a first local oscillator (shown as LO 208). IF circuitry 210, automatic gain control circuitry (shown as AGC 212), a second mixer 214, and a second local oscillator (shown as LO 216). The antenna 202 provides an RF signal to the RF front end circuitry 204. The RF front end circuitry 204 may include, for example, a low noise amplifier (LNA), filters, and other circuitry (e.g., switches) to detect and amplify the RF signal and provide it to the first mixer 206. According to certain embodiments herein, the RF signal includes M copies of a duplicated signal or channel transmitted from a base station (e.g., an eNB, gSTB, or other network node). The RF signal comprises uniform frequency offsets between the plurality of copies of the duplicated signal and includes a gap between adjacent copies.

A first input of the first mixer 206 receives the RF signal from the RF front end circuitry 204 and a second input of the first mixer 206 receives a signal from the LO 208. The first mixer 206 outputs an IF signal. The IF signal is provided to the IF circuitry 210, which may include a high gain amplifier, filters, and other circuitry (e.g., switches). In certain embodiments, an output of the IF circuitry 210 is fed back to the RF front end circuitry 204 through the AGC 212 to regulate the received signal strength at the input of the ADC (e.g., the ADC 104 shown in FIG. 1). Alternatively, the baseband signal may be fed back through the AGC 212. A first input of the second mixer 214 receives the IF signal from the IF circuitry 210 and a second input of the second mixer 214 receives a signal from the LO 216 to convert the IF signal to the baseband signal. As discussed herein, the baseband signal includes the M copies of the duplicated signal uniformly offset from one another in the frequency domain by a bandwidth F and including a gap between adjacent copies.

Coherence refers to frequencies of a signal within a bandwidth that are likely to experience comparable or correlated amplitude fading. Coherence loss may be due to transmit (Tx) or receive (Rx) chain group delay or due to the wireless channel. In coherence loss due to Tx/Rx chain group delay, the combining from M copies may not be perfect wherein instead of obtaining a log2(M) dB boost, the combining gain may be less. However, certain embodiments provide low group delay that does not create significant coherence loss.

Regarding coherence loss due to the wireless channel, if the delay spread of the wireless channel is small, then the phase rotation for different copies will be small. However, if the delay can be estimated or the phase rotation can be estimated (e.g., from previous observations), then it may be possible to pre-compensate the analog base band signal at the anti-aliasing filtering (combined processing) or prior to the analog base band signal. Thus, certain embodiments include a phase adjustment circuit prior to the anti-aliasing filter so the phase in the frequency domain can be adjusted (e.g., 30 degrees around 50 MHz, 40 degrees around 100 MHz, etc.). As impedance matching for antenna (at RF) and Rx beamforming at RF for millimeter wave communications can be implemented in a practical implementation, phase adjustment at the baseband frequency may be even easier for implementation.

Figure 3A:
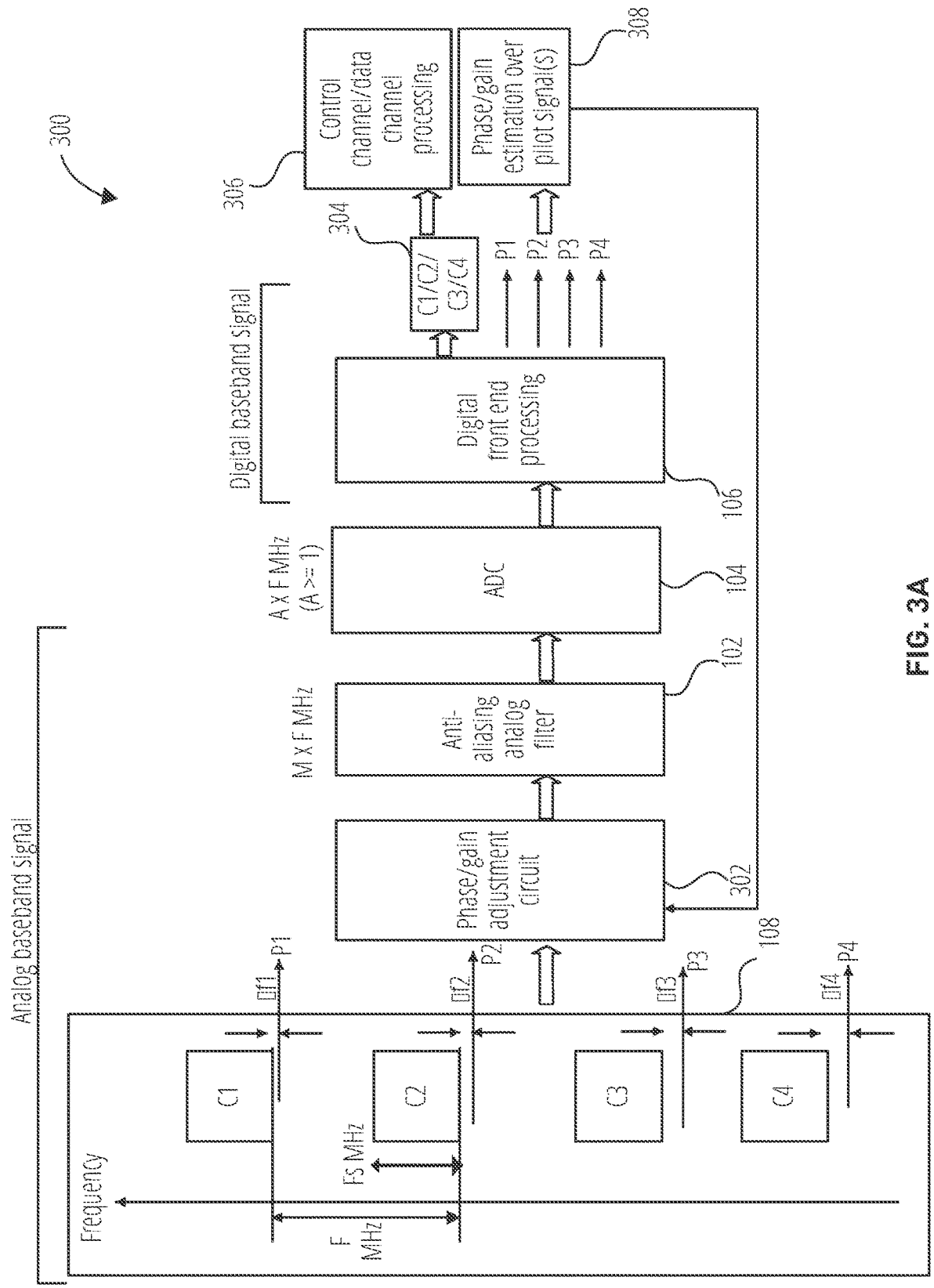
FIG. 3A illustrates phase/gain estimation over the pilot signals in the digital domain in accordance with one embodiment.
Figure 3B:
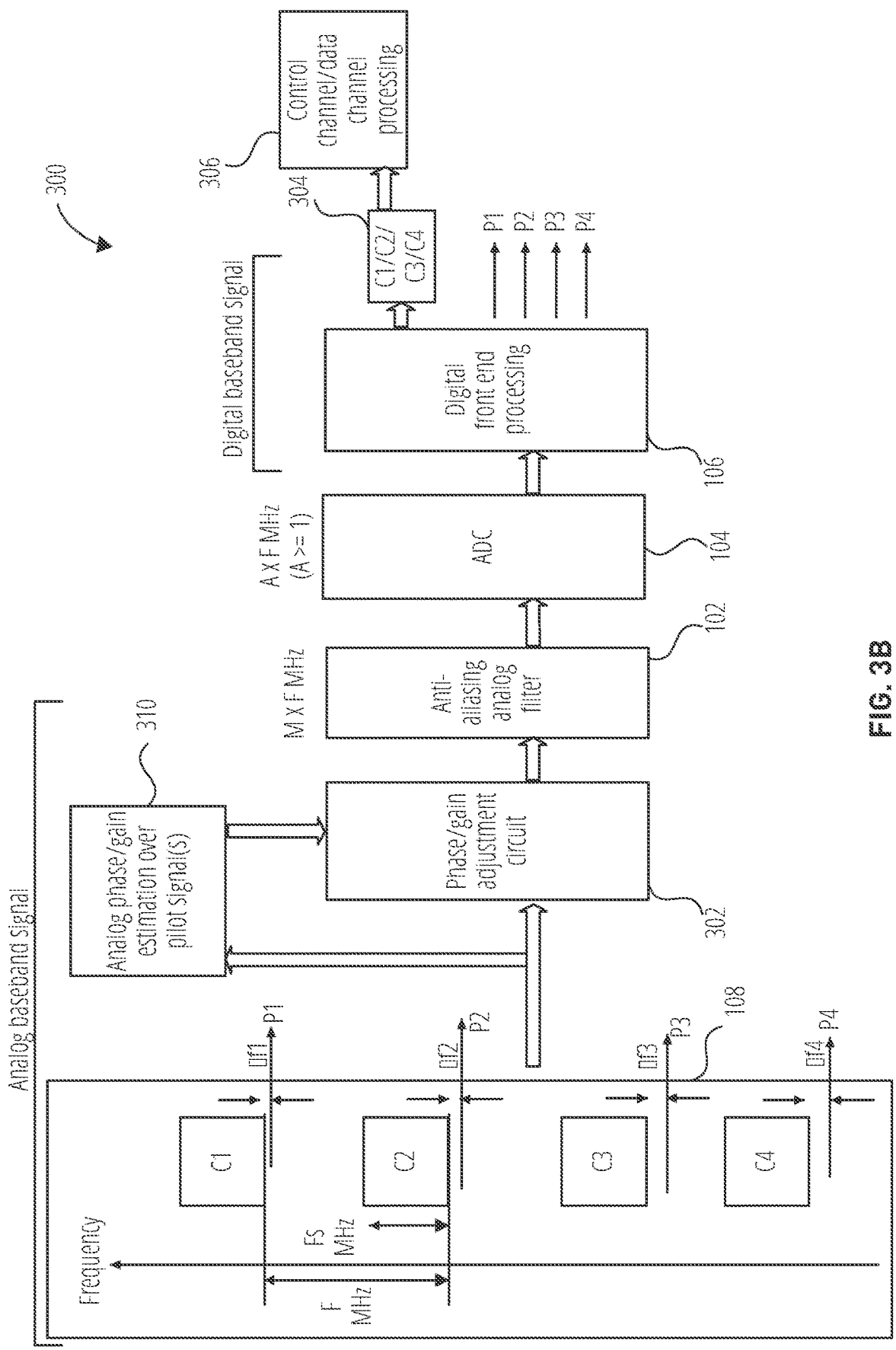
FIG. 3B illustrates phase/gain estimation over the pilot signals in the analog domain in accordance with one embodiment.

In certain embodiments, to compensate for coherence loss, pilot signals (also referred to herein as pilot tones) are included in the RF signal from the base station, and subsequently the analog baseband signal 108, for each duplicated signal 110. On the base station (e.g., gNB) side, pilot signal $P_k$ is inserted for copy k, and each pilot signal $P_k$ is at a different related location. For example, FIG. 3A and FIG. 3B illustrate additional UE receiver components 300 to compensate for coherence loss using pilot signal $P_k$ (shown as pilot signals P1, P2, P3, and P4) separated from the lower edge of copy k by $\Delta f_k$ Hz, where $\Delta f_1 \neq \Delta f_2 \neq \Delta f_3 \neq \Delta f_4$. In other words, pilot signal P1 is separated from the lower edge of copy C1 by $\Delta f_1$, pilot signal P2 is separated from the lower edge of copy C2 by $\Delta f_2$, pilot signal P3 is separated from the lower edge of copy C3 by $\Delta f_3$, and pilot signal P4 is separated from the lower edge of copy C4 by $\Delta f_4$. Because the pilot signals are at different relative locations with respect to corresponding copies of the duplicated signal 110, the pilot signals do not get folded over each other by the ADC 104.

After digital baseband processing or analog baseband processing (e.g., with four notch filters) the phase at each pilot tone is estimated and fed to a phase/gain adjustment circuit 302. To make the design more robust, according to certain embodiments, more than one tone can be used (e.g., two or more tones) for each pilot signal $P_k$, so frequency selective fading will not pose a serious issue. The phase and/or gain of the pilot signals $P_k$ can be estimated through phase/gain estimation over pilot signal(s) circuitry, and the estimated phases are fed to the phase/gain adjustment circuit 302.

For example, FIG. 3A illustrates phase/gain estimation over the pilot signals in the digital domain, according to one embodiment. After the analog baseband signal 108 passes through the anti-aliasing analog filter 102, the ADC 104 and the digital front end processing circuitry 106, a combined digital copy 304 of the duplicated signal (C1/C2/C3/C4) is provided to control channel/data channel processing circuitry 306 and digital copies of the pilot signals P1, P2, P3, and P4 are provided to digital phase/gain estimation circuitry 308. In one example, the pilot signals P1, P2, P3, and P4 are derived from the same baseband signal P(t), and their corresponding RF signals are $P(t)e^{-\sqrt{-1}2\pi(f_c+F+\Delta f_1)t}$, $P(t)e^{-\sqrt{-1}2\pi(f_c+F+\Delta f_2)t}$, $P(t)e^{-\sqrt{-1}2\pi(f_c+F+\Delta f_3)t}$, $P(t)e^{-\sqrt{-1}2\pi(f_c+F+\Delta f_4)t}$, from the transmitter, where $f_c$ is the carrier frequency for C1; at input to the phase/gain adjustment circuit 302, the corresponding baseband signals are $_1P(t)e^{-\sqrt{-1}2\pi(\Delta f_1)t}$, $_2P(t)e^{-\sqrt{-1}2\pi(\Delta f_2)t}$, $_3P(t)e^{-\sqrt{-1}2\pi(\Delta f_3)t}$, $_4P(t)e^{-\sqrt{-1}2\pi(\Delta f_4)t}$, where $h_1$, $h_2$, $h_3$ and $h_4$ are due to wireless channel and group delays in the transmitter/receiver circuits. As those baseband signals are at known frequency offsets to each other, and P(t) is known at the UE receiver, estimates of $h_1$, $h_2$, $h_3$ and $h_4$ can be obtained and the relative phase/gain can be estimated from $$\frac{h_2}{h_1}, \frac{h_3}{h_1}, \frac{h_4}{h_1}$$

when $h_1$ is used as reference. The digital phase/gain estimation circuitry 308 sends feedback of the relative phase and/or gain of the digital copies of the pilot signals P1, P2, P3, and P4 to the phase/gain adjustment circuit 302. The phase/gain adjustment circuit 302 adjusts the relative phases of the duplicated signals (e.g. if C1 has the strongest copy, $|h_2|$, $|h_3|$, $|h_4| \leq |h_1|$, |, by applying $$conj\left(\frac{h_2}{h_1}\right), conj\left(\frac{h_3}{h_1}\right), conj\left(\frac{h_4}{h_1}\right)$$

to C2/C3/C4 respectively so to align their phases with C1's) to adjust for coherence loss. In the phase/gain adjustment circuit, the receiver can choose to adjust for phase compensation sorely, gain adjustments only, or phase and gain adjustments. After phase adjustments only, ignoring interference and noise, the signal at the input to the digital front end processing circuitry 106 is proportional to $|h_1|C_1(t)+|h_2|C_2(t)+|h_3|C_3(t)+|h_4|C_4(t)$, where $C_1(t)$, $C_2(t)$, $C_3(t)$, $C_4(t)$ are the baseband signals for C1/C2/C3/C4; with duplication we have $C_1(t)=C_2(t)=C_3(t)=C_4(t)$. After gain adjustments only $$\left(\text{with } \frac{1}{|h_k|}, k = 1, 2, 3, 4\right),$$

ignoring interference and noise, the signal at the input to the digital front end processing circuitry 106 is proportional to $e^{j \cdot angle(h_1)}C_1(t)+e^{j \cdot angle(h_2)}C_2(t)+e^{j \cdot angle(h_3)}C_3(t)+e^{j \cdot angle(h_4)}C_4(t)$, where $C_1(t)$, $C_2(t)$, $C_3(t)$, $C_4(t)$ are the baseband signals for C1/C2/C3/C4; with duplication we have $C_1(t)=C_2(t)=C_3(t)=C_4(t)$. After phase and gain adjustments (with conj ($h_k$), k=1,2,3,4), ignoring interference and noise, the signal at the input to the digital front end processing circuitry 106 is proportional to $|h_1|^2C_1(t)+|h_2|^2C_2(t)+|h_3|^2C_3(t)+|h_4|^2C_4(t)$, where $C_1(t)$, $C_2(t)$, $C_3(t)$, $C_4(t)$ are the baseband signals for C1/C2/C3/C4; with duplication we have $C_1=C_2(t)=C_3=C_4(t)$. Thus, the duplicated signals are aligned to be folded over one another by the ADC 104. Similar to insertion of pilot signals for different copies, insertion of resources for interference and noise estimation can be also used to estimate the interference/noise at different copies. Then the inputs to the phase/gain adjustment circuit are not conditioned by the estimates from pilot signals only, the interference and noise estimation can be also considered. In some cases, the interference level at a given copy say C2 can be high, or the channel fade at a given copy (say C2) can be severe; the net result is that the SINR or signal strength at a given copy can be low. In this case a low gain such as zero or a value close to zero can be set for the frequency bandwidth around the copy with low SINR/signal strength, so the folded signal contains a small input from that copy to avoid that copy bringing down the SINR in the folded signal.

Instead of using frequency offset to differentiate pilot signals, in another possible design for pilot signal design, code division multiplexing (CDM) can used. The signals for P1, P2, P3 and P4, $S_1(t)e^{-\sqrt{-1}\cdot 2\pi f_c t}$, $S_2(t)e^{-\sqrt{-1}\cdot 2\pi f_c t}$, $S_3(t)e^{-\sqrt{-1}\cdot 2\pi f_c t}$, $S_4(t)e^{-\sqrt{-1}\cdot 2\pi f_c t}$, $S_1(t)$, $S_2(t)$, ..., $S_4(t)$ can be generated as sequences orthogonal to one another. e.g. Zadoff-Chu sequences, Fourier sequences, Walsh-Hadamard sequences, etc. to facilitate detect at the receiver side. It is also possible to use quasi-orthogonal sequences such as m-sequences, Gold sequences, etc., P1, P2, P3 and P4 are overlaid in C1/C2/C3/C4 respectively or they use dedicated resources in C1/C2/C3/C4, with sufficient processing gains, both overlaying and transmission with dedicated resources can allow the receiver to estimate $h_1$, $h_2$, $h_3$ and $h_4$ or their ratios and apply the afore given procedure to compensate for phase and/or gain difference.

FIG. 3B illustrates phase/gain estimation over the pilot signals in the analog domain, according to another embodiment. In FIG. 3B, analog phase/gain estimation circuitry 310 is configured to receive the analog, baseband signal 108. The analog phase/gain estimation circuitry 310 may include, for example, notch filters to separate the pilot signals P1, P2, P3, and P4 from the analog baseband signal 108. The analog phase/gain estimation circuitry 310 may provide phase estimates of the pilot signals P1, P2, P3, and P4, or the pilot signals P1, P2, P3, and P4 themselves, to the phase/gain adjustment circuit 302 for phase/gain adjustment to correct for coherence loss. Thus, the duplicated signals are aligned to be folded over one another by the ADC 104.

In certain embodiments, the ADC 104 has two operational modes. In a first mode (Mode 1), the ADC 104 is configured with a low sampling frequency, for example at F MHz. Mode 1 may be considered a diversity mode or diversity exploitation mode wherein duplication in the frequency domain is used. Mode 1 may be useful, for example, to target highly reliable and moderate rate data communications. In a second mode (Mode 2), the ADC 104 is configured with a high sampling frequency, for example at M×F MHz. Mode 2 may be considered a high throughput mode wherein duplication in the frequency domain is not used. Mode 2 may be useful, for example, to target high throughput data communications. As discussed above, a tradeoff for such high throughput communications is that the ADC 104 may consume significantly more power in Mode 2 than it consumes in Mode 1.

As discussed above, a design consideration for certain embodiments is ADC switch time for mode switching between Mode 1 and Mode 2. In certain embodiments, for FR1 the ADC switch time is at the cyclic prefix (CP) level (e.g., a few milliseconds). For FR2, more margin may be used for ADC switching. For example, if using Mode 1 for a physical downlink control channel (PDCCH) and Mode 2 for a physical downlink shared channel (PDSCH) in FR2, as different Rx beams may be used for the reception of PDCCH and PDSCH, a switching gap between reception of PDCCH and PDSCH may already be reserved, that can be also used for mode switching. In certain embodiments, the switching gap between reception of PDCCH and PDSCH is sufficient for ADC switching between processing the PDCCH in Mode 1 and processing the PDSCH in Mode 2.

If the duplicated signal 110 is PDCCH, then the number of non-overlapping control channel elements (CCEs) may not need to increase compared to the case the UE receives the PDCCH over a small bandwidth (e.g., a single copy of the PDCCH), hence channel estimation effort does not explode or become overly difficult as a wide bandwidth is used for PDCCH transmission. In certain embodiments, once the PDCCH is decoded and downlink control information (DC1) scheduling a PDSCH is detected, then the ADC 104 is switched from Mode 1 to Mode 2 for PDSCH reception. However, if duplication is also used for the PDSCH, then certain embodiments may stay in Mode 1 for both the PDCCH and the PDSCH. Mode switching from Mode 1 to Mode 2 can be explicitly indicated in DCI or implicitly indicated. In one example, a field for mode switching can be introduced in DCI, the field can be of 1 bit: for example "0" for mode 1 and "1" for mode 2. For example, if the PDSCH transport block size is below a threshold level, then the UE stays in Mode 1 for the PDSCH. On the other hand, if the PDSCH is above the threshold level, the UE switches the ADC from Mode 1 to Mode 2 for the PDSCH. As another example of implicit indication of ADC mode switching, according to another embodiment, certain entries in a frequency domain resource allocation (FDRA) table may be associated with using Mode 1 and other entries in the FDRA table may be associated with using Mode 2.

Figure 4:
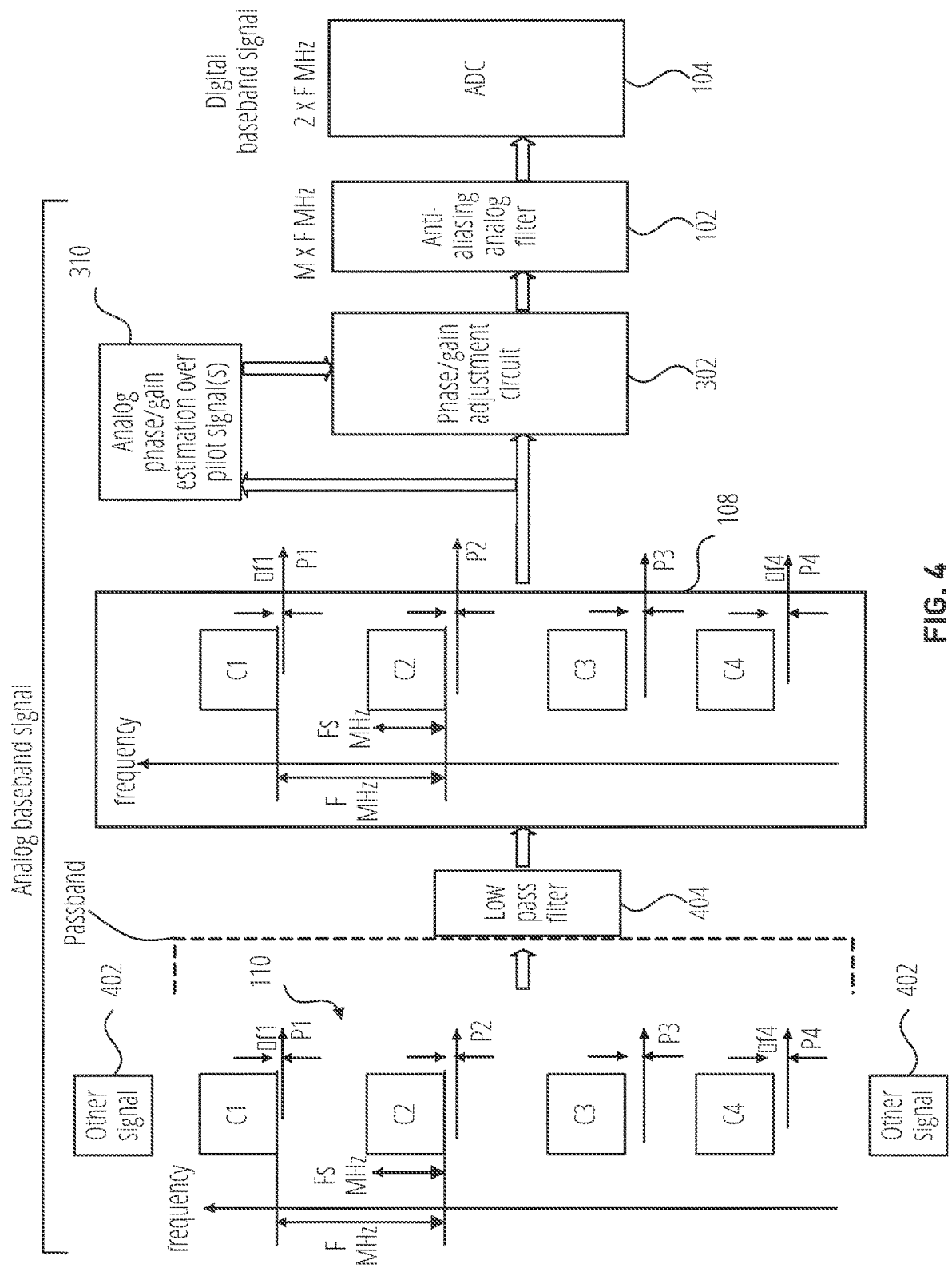
FIG. 4 illustrates a duplicated signal intended for a first group of UEs and other signal(s) intended for a second group of UEs in accordance with one embodiment.

In certain embodiments, Mode 1 and Mode 2 may be multiplexed from the network point of view. For example, FIG. 4 illustrates the duplicated signal 110 (with copies C1, C2, C3, and C4) intended for a first group of UEs and other signal(s) 402 intended for a second group of UEs. By way of example, three UEs operating in Mode 1 may be served by copies C1, C2, C3, and C4 of the duplicated signal 110 and four UEs operating in Mode 2 may be served by the other signal(s) 402. The UEs operating in Mode 1 may use a low pass filter 404 with a passband configured to remove the other signal(s) 402 not belonging to Mode 1 operation. Similarly, the UEs operating in Mode 2 may filter out the duplicated signal 110 and process the other signal(s) 402.

In certain embodiments, for initial access (e.g., in FR2 and/or beyond 52.6 GHz), the duplicated signal 110 shown in the figures discussed above, may comprise a synchronization signal block (SSB). In certain such embodiments, the UE is configured to conduct a cell search over the SSB raster only, even though the base station (e.g., gNB) places its duplications across frequencies.

Figure 5:
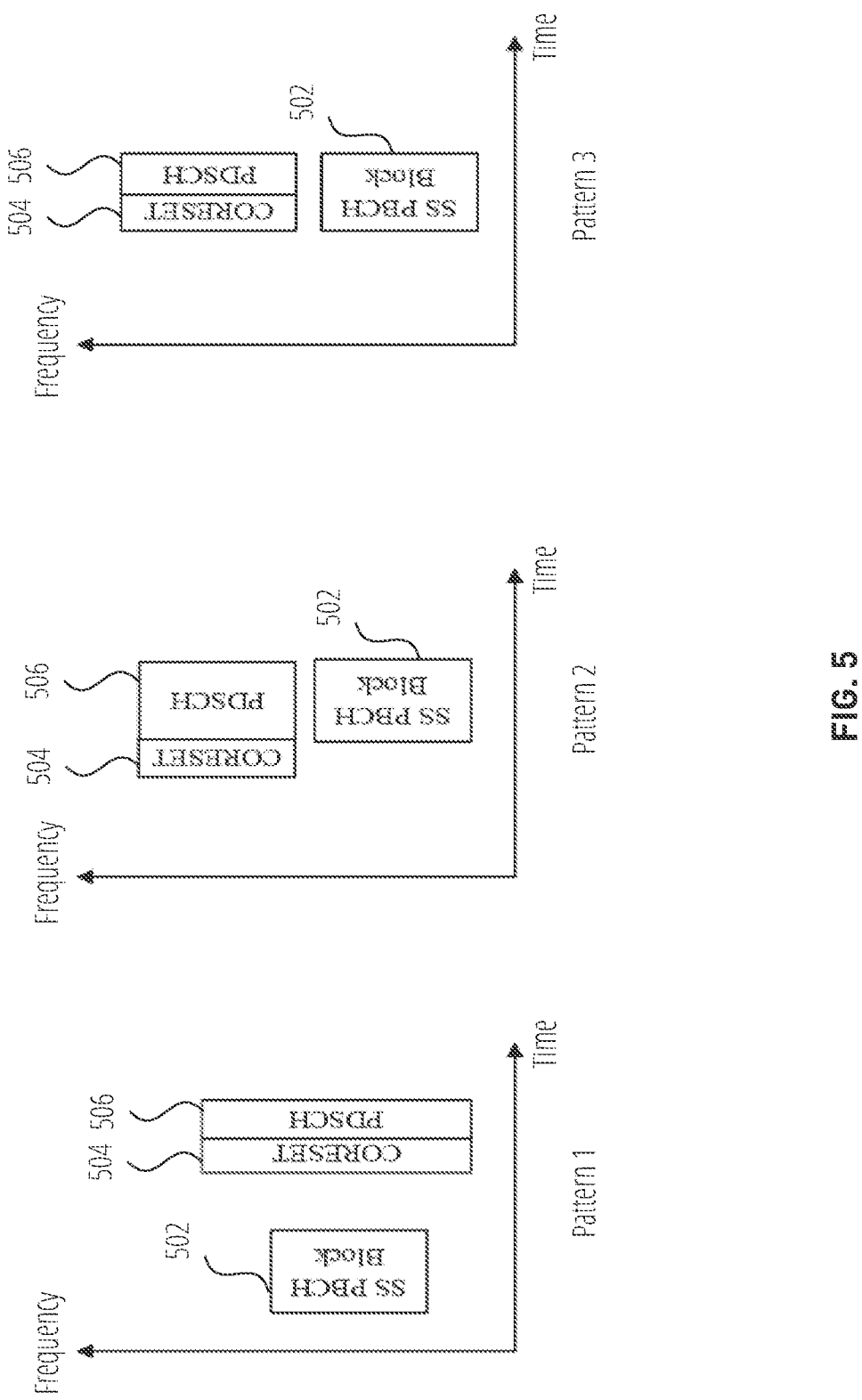
FIG. 5 illustrates example use cases in accordance with one embodiment.

FIG. 5 illustrates example use cases where different patterns (three shown) of SSB (shown as SS PBCH block 502), control resource set 0 (shown as CORESET 504), and remaining minimum system information (RMSI) PDSCH (shown as PDSCH 506) multiplexing may be handled by the embodiments disclosed herein.

Figure 6:
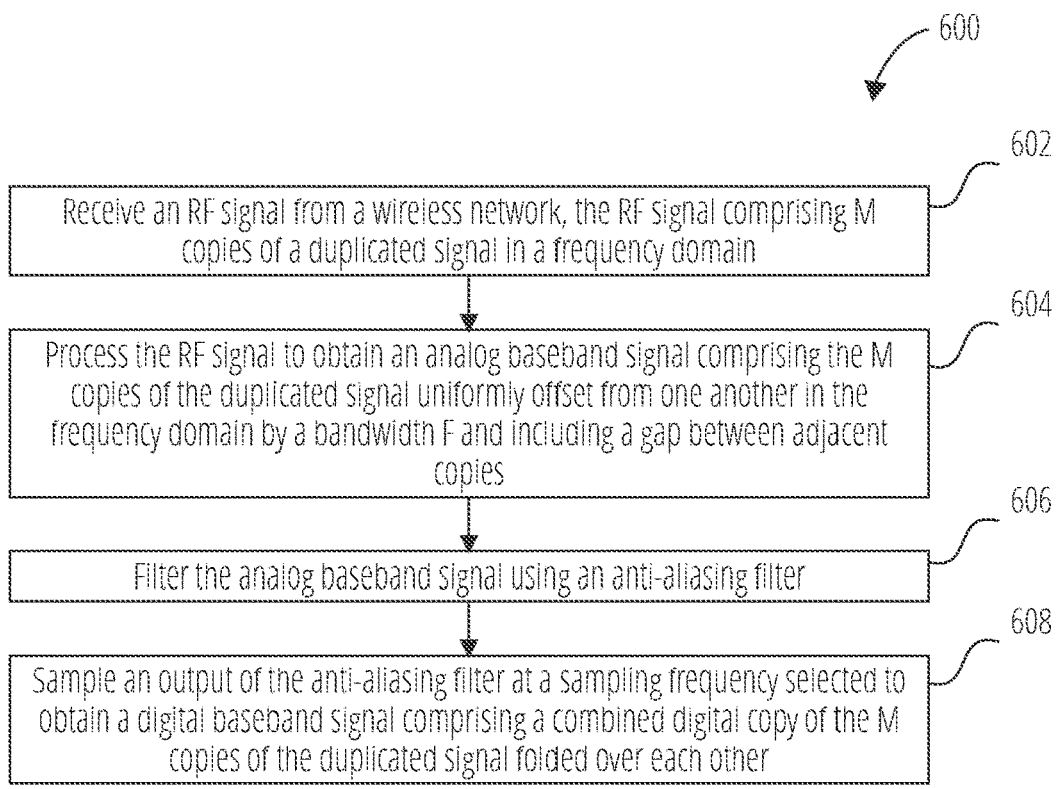
FIG. 6 is a flowchart illustrating a method for communication by a UE in accordance with one embodiment.

FIG. 6 is a flowchart illustrating a method 600 for communication by a UE. In block 602, the method 600 includes receiving a radio frequency (RF) signal from a wireless network. The RF signal comprises M copies of a duplicated signal in a frequency domain. In block 604, the method 600 includes processing the RF signal to obtain an analog baseband signal comprising the M copies of the duplicated signal uniformly offset from one another in the frequency domain by a bandwidth F and including a gap between adjacent copies. In block 606, the method 600 includes filtering the analog baseband signal using an anti-alia sing filter. In block 608, the method 600 includes sampling an output of the anti-abasing filter at a sampling frequency selected to obtain a digital baseband signal comprising a combined digital copy of the M copies of the duplicated signal folded over each other.

In certain embodiments of the method 600, the anti-aliasing filter comprises a passband of at least M×F, and wherein the sampling frequency is M'×F, where M' is an integer smaller than M.

In certain embodiments of the method 600, each of the M copies of the duplicated signal in the analog baseband signal comprises an occupied signal bandwidth Fs, where Fs<F (Fs is less than F).

In certain embodiments, the method 600 further comprises digital baseband processing the combined digital copy for subsequent control channel or data channel processing.

In certain embodiments of the method 600, the analog baseband signal further comprises pilot signals. Each of the pilot signals is offset from a respective one of the M copies of the duplicated signal by a unique offset frequency. In certain such embodiments, the method 600 further comprises generating an estimate of at least one of a phase difference and a gain difference between the pilot signals, and before filtering the analog baseband signal using the anti-aliasing filter, based on the estimate, phase adjusting and/or gain adjusting one or more of the M copies of the duplicated signal to compensate for coherence loss. In addition, or in other embodiments, the digital signal further includes digital versions of the pilot signals, and generating the estimate comprises processing the digital versions of the pilot signals using digital circuitry for estimating at least one of the phase difference and the gain difference, and providing feedback from the digital circuitry to phase adjustment and/or gain adjustment circuitry configured to provide the phase adjusting. In other embodiments, wherein generating the estimate comprises separating the pilot signals from the analog baseband signal using notch filters, processing the pilot signals using analog circuitry for estimating at least one of the phase difference and the gain difference, and providing feedback from the analog circuitry to phase adjustment circuitry configured to provide the phase adjusting.

In certain embodiments, the method 600 further comprises switching from sampling the output of the anti-aliasing filter at a first sampling frequency of F in a first mode to a second sampling frequency of M×F in a second mode. In certain such embodiments, the method 600 further comprises selecting the first mode for frequency diversity to receive high reliability and moderate throughput data, and selecting the second mode for high throughput data. In addition, or in other embodiments, the method 600 further comprises, to switch from the first mode to the second mode, using a first predetermined switching time for FR1 and a second predetermined switching time for FR2.

In certain embodiments of the method 600, the duplicated signal comprises a physical downlink control channel (PDCCH), wherein switching from the first mode to the second mode is explicitly indicated to the UE in downlink control information (DCI) scheduling a physical downlink shared channel (PDSCH). In other embodiments, the UE implicitly determines to switch from the first mode to the second mode based on a transport block size of a physical downlink shared channel (PDSCH) or an entry in a frequency domain resource allocation (FDRA) table associated with the second mode. The method 600 may further include selectively filtering the analog baseband signal to pass the M copies of the duplicated signal in the first mode and to pass one or more other signals in the second mode.

In certain embodiments of the method 600, the duplicated signal comprises a synchronization signal block (SSB), and the method 600 further comprising conducting a cell search, by the UE, over an SSB raster only.

In certain embodiments of the method 600, the M copies comprises at least four copies of the duplicated signal.

Figure 7:
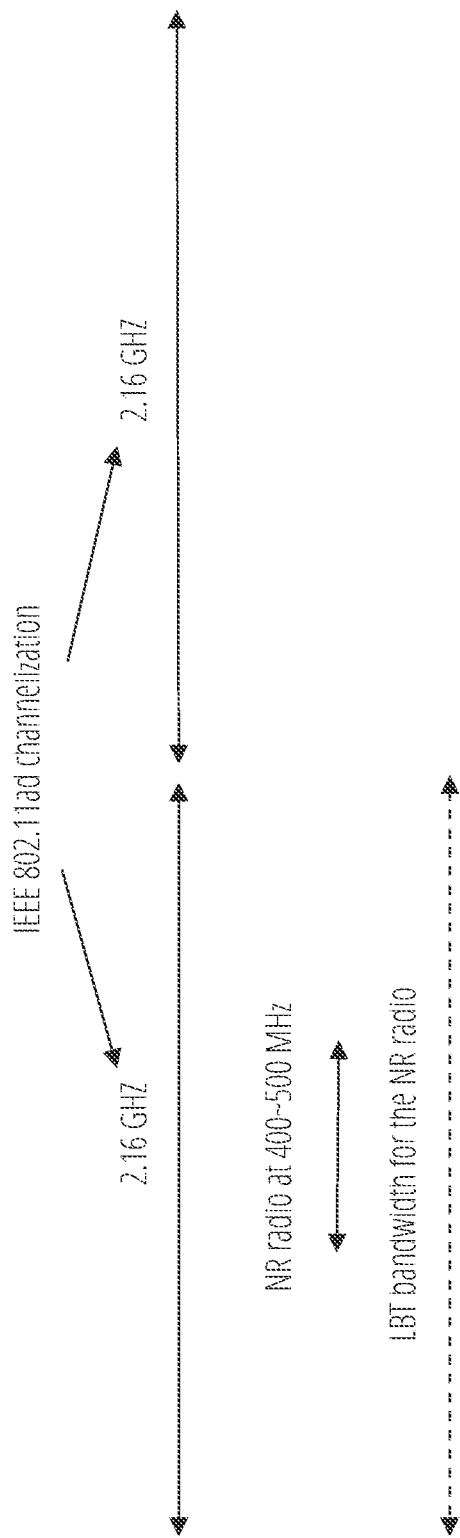
FIG. 7 illustrates an example NR radio operating bandwidth in accordance with certain embodiments.

As shown in FIG. 7, it may happen that an NR radio's operating bandwidth (e.g., say at 400-500 MHz) is smaller than the operating bandwidth of another radio, for example a radio with the IEEE 802.11ad or IEEE 802.11ay standard. The IEEE 802.11ad/IEEE 802.11ay bandwidth can be at 2.16 GHz. For the NR device's operation, including receiving PBCH/PSS/SSS, reception of PDCCH and PDSCH, the operation is limited to the afore mentioned small bandwidth (400~500 MHz for example). However, due to consideration on coexistence with radios with large operating bandwidth such as IEEE 802.11ad/802.11ay, it may become necessary for the NR radio to perform CCA (Clear Channel Assessment) over the wideband channel operation at 2.16 GHz in the listen-before-talk procedure. In this case, even though the IEEE 802.11ad/802.11 ay signal may not consist of duplicated copies of a single signal, the folding due to undersampling can be still exploited to reduce UE power consumption in CCA and avoid implementing high speed sampling solely for the LBT procedure. As energy detection is a goal for CCA, folded signal spectrum from IEEE 802.11ad/802.11ay (e.g., over 400-500 MHz) can still indicate its power level. In this case, the receiver for the block 606 and/or the block 608 can be used for performing CCA for a wideband signal with a narrowband baseband processing (note in this case the anti-aliasing analog filter is set with M×F MHz as passband; and in contrast for operation other than CCA in LET, the anti-aliasing analog filter is set with F MHz as passband).

Figure 8:
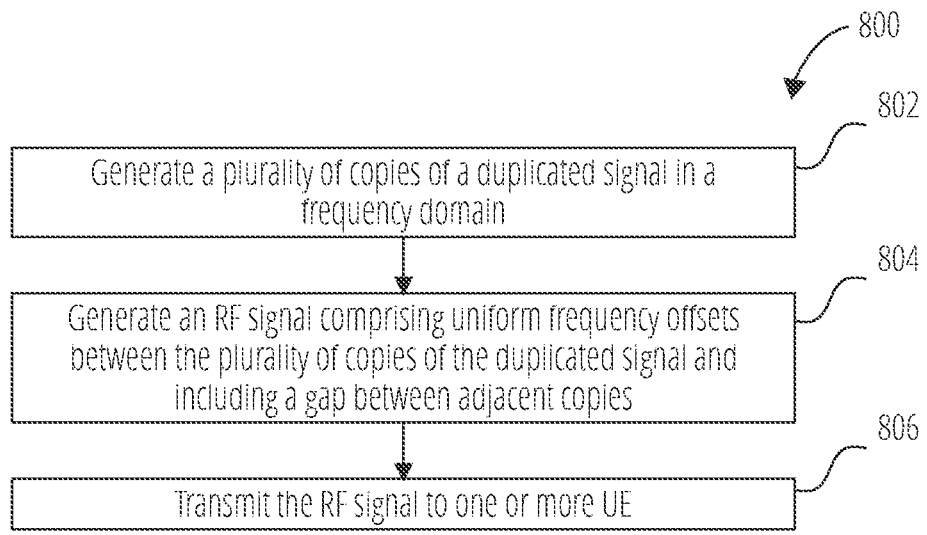
FIG. 8 is a flowchart of a method for a base station in accordance with one embodiment.

FIG. 8 is a flowchart of a method 800 for a base station. In block 802, the method 800 includes generating a plurality of copies of a duplicated signal in a frequency domain. In block 804, the method 800 includes generating an RE signal comprising uniform frequency offsets between the plurality of copies of the duplicated signal and including a gap between adjacent copies. In block 806, the method 800 includes transmitting the RF signal to one or more UE.

In certain embodiments, the method 800 further comprises selecting the gap based on a tradeoff between increasing a utilization of a power spectrum density (PSD) of the RF signal and reducing a complexity of an anti aliasing filter in the one or more UE.

In certain embodiments of the method 800, the plurality of copies comprises at least two copies of the duplicated signal. In other embodiments, the plurality of copies comprises at least four copies of the duplicated signal.

In certain embodiments, the method 800 further comprises including pilot signals in the RF signal, each of the pilot signals offset from a respective one of the plurality of copies of the duplicated signal by a unique offset frequency.

In certain embodiments of the method 800, the duplicated signal comprises a physical downlink control channel (PDCCH), and the method 800 further comprises, after transmitting the RF signal to the one or more UE, sending a downlink control information (DCC) to the one or more UE to schedule a physical downlink shared channel (PDSCH), the DCI comprising an indication to switch from a diversity mode of operation to a high throughput mode of operation.

In certain embodiments, the method 800 further comprises multiplexing one or more other signals with the plurality of copies of the duplicated signal in the RF signal, wherein the plurality of copies of the duplicated signal are for the one or more UE operating in a diversity mode of operation and the one or more other signals are for one or more other UEs operating in a high throughput mode of operation.

Figure 9:
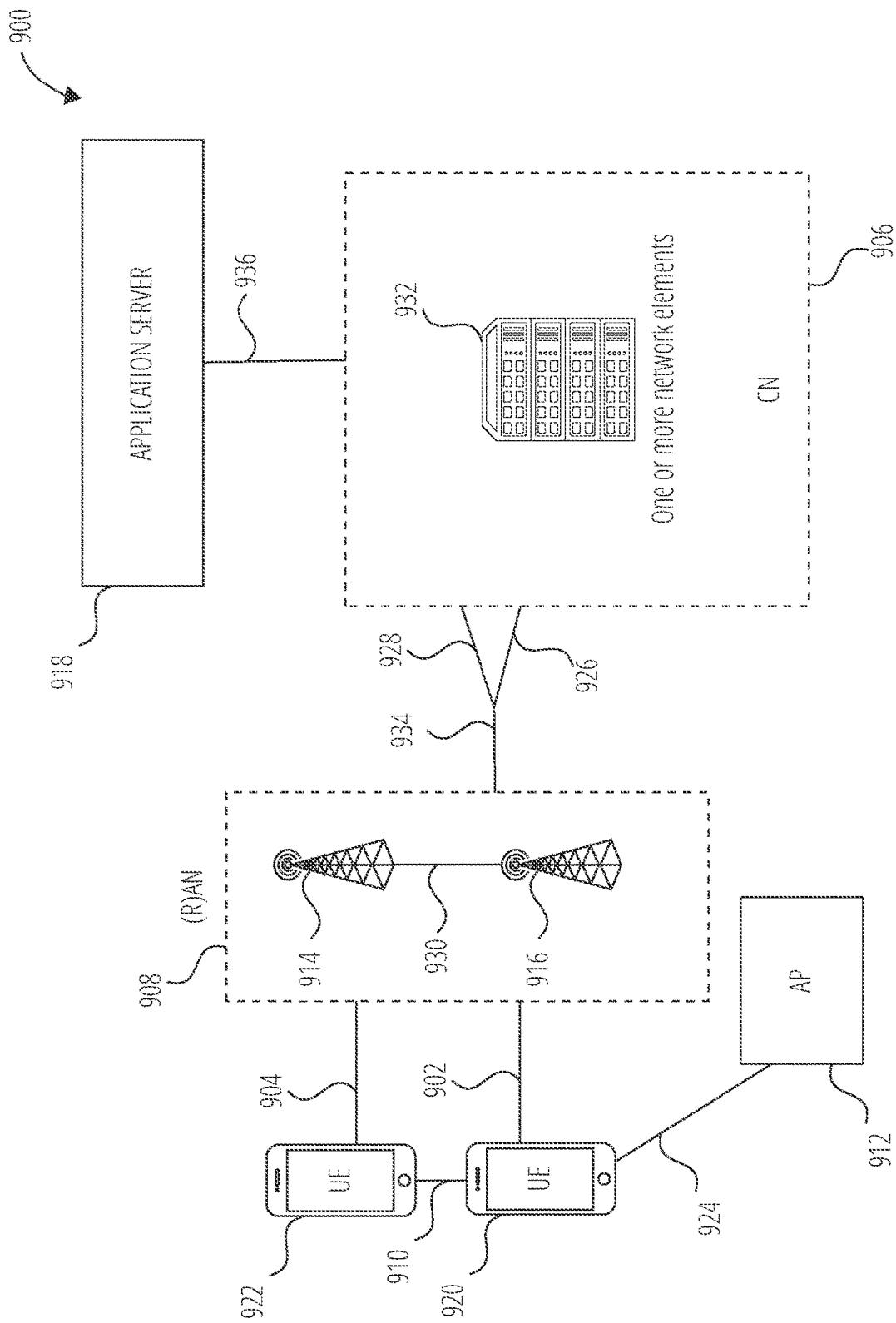
FIG. 9 illustrates a system in accordance with one embodiment.

FIG. 9 illustrates an example architecture of a system 900 of a network, in accordance with various embodiments. The following description is provided for an example system 900 that operates in conjunction with the UT; system standards and 5G or NR system standards as provided by 3GPP technical specifications. However, the example embodiments are not limited in this regard and the described embodiments may apply to other networks that benefit from the principles described herein, such as future 3GPP systems (e.g. Sixth Generation (6G)) systems, IEEE 802.16 protocols (e.g., WMAN, WiMAX, etc.), or the like.

As shown by FIG. 9, the system 900 includes UE 922 and UE 920. In this example, the UE 922 and the UE 920 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 922 and/or the UE 920 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 922 and UE 920 may be configured to connect, for example, communicatively couple, with an access node or radio access node (shown as (R)AN 908). In embodiments, the (R)AN 908 may be an NG RAN or a SG RAN, an E-UTRAN, or a legacy RAN, such as a UTRAN or GERAN. As used herein, the term "NG RAN" or the like may refer to a (R)AN 908 that operates in an NR or SG system, and the term "E-UTRAN" or the like may refer to a (R)AN 908 that operates in an LTE or 4G system. The UE 922 and UE 920 utilize connections (or channels) (shown as connection 904 and connection 902, respectively), each of which comprises a physical communications interface or layer (discussed in further detail below).

In this example, the connection 904 and connection 902 are air interfaces to enable communicative coupling, and can be consistent with cellular communications protocols, such as a GSM protocol, a CDMA network protocol, a PT r protocol, a POC protocol, a UMTS protocol, a 3GPP LTE protocol, a SG protocol, a NR protocol, and/or any of the other communications protocols discussed herein. In embodiments, the UE 922 and UE 920 may directly exchange communication data via a ProSe interface 910. The ProSe interface 910 may alternatively be referred to as a sidelink (SL) interface 110 and may comprise one or more logical channels, including but not limited to a PSCCH, a PSSCH, a PSDCH, and a PSBCH.

The UE 920 is shown to be configured to access an AP 912 (also referred to as "WLAN node," "WLAN," "WLAN Termination," "WT" or the like) via connection 924. The connection 924 can comprise a local wireless connection, such as a connection consistent with any IEEE 802.11 protocol, wherein the AP 912 would comprise a wireless fidelity (Wi-Fi®) router. In this example, the AP 912 may be connected to the Internet without connecting to the core network of the wireless system (described in further detail below). In various embodiments, the UE 920, (R)AN 908, and AP 912 may be configured to utilize LWA operation and/or LWIP operation. The LWA operation may involve the UE 920 in RRC_CONNECTED being configured by the RAN node 914 or the RAN node 916 to utilize radio resources of LTE and WLAN. LWIP operation may involve the UE 920 using WLAN radio resources (e.g., connection 924) via. IPsec protocol tunneling to authenticate and encrypt packets (e.g., IP packets) sent over the connection 924. IPsec tunneling may include encapsulating the entirety of original IP packets and adding a new packet header, thereby protecting the original header of the IP packets.

The (R)AN 908 can include one or more AN nodes, such as RAN node 914 and RAN node 916, that enable the connection 904 and connection 902. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPS, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 900 (e.g., an eNB). According to various embodiments, the RAN node 914 or RAN node 916 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 914 or RAN node 916 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 914 or RAN node 916); a MAC/PHY split wherein RRC, PDCP, RLC, and MAC layers are operated by the CRAN/vBBUP and the PHY layer is operated by individual RAN nodes (e.g., RAN node 914 or RAN node 916); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 914 or RAN node 916 to perform other virtualized applications. In some implementations, an individual RAN node may represent individual gNB-DUs that are connected to a gNB-CU via individual F1 interfaces (not shown by FIG. 9). In these implementations, the gNB-DUs may include one or more remote radio heads or RFEMs, and the gNB-CU may be operated by a server that is located in the (R)AN 908 (not shown) or by a server pool in a similar manner as the CRAN/vBBUP. Additionally, or alternatively, one or more of the RAN node 914 or RAN node 916 may be next generation eNBs (ng-eNBs), which are RAN nodes that provide E-UTRA user plane and control plane protocol terminations toward the UE 922 and UE 920, and are connected to an SOC via an NG interface (discussed infra). In V2X scenarios one or more of the RAN node 914 or RAN node 916 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU" an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X, band to provide the aforementioned low latency communications, as well as other cellular communications services. Additionally, or alternatively, the RSU may operate as a Wi-Fi hotspot (2.40 Hz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 914 and/or the RAN node 916 can terminate the air interface protocol and can be the first point of contact for the UE 922 and UE 920. In some embodiments, the RAN node 914 and/or the RAN node 916 can fulfill various logical functions for the (R)AN 908 including, but not limited to, radio network controller (RNC) functions such as radio bearer management, uplink and downlink dynamic radio resource management and data packet scheduling, and mobility management.

In embodiments, the UE 922 and UE 920 can be configured to communicate using OFDM communication signals with each other or with the RAN node 914 and/or the RAN node 916 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 914 and/or the RAN node 916 to the UE 922 and UE 920, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 922 and UE 920 and the RAN node 914 and/or the RAN node 916 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 922 and UE 920 and the RAN node 914 or RAN node 916 may operate using LAA, eLAA, and/or feLAA mechanisms. In these implementations, the UE 922 and UE 920 and the RAN node 914 or RAN node 916 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 922 and UE 920, RAN node 914 or RAN node 916, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RE energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 922, AP 912, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. Ira TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 922 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 922 and UE 920. The PDCCH carries information about the transport format and resource allocations related to the PDSCH channel, among other things. It may also inform the UE 922 and UE 920 about the transport format, resource allocation, and HARQ information related to the uplink shared channel. Typically, downlink scheduling (assigning control and shared channel resource blocks to the UE 920 within a cell) may be performed at any of the RAN node 914 or RAN node 916 based on channel quality information fed back from any of the UE 922 and UE 920. The downlink resource assignment information may be sent on the PDCCH used for (e.g., assigned to) each of the UE 922 and UE 920.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 914 or RAN node 916 may be configured to communicate with one another via interface 930. In embodiments where the system 900 is an LTE system when CN 906 is an EPC), the interface 930 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 922 from an SeNB for user data; information of PDCP PDUs that were not delivered to a UE 922; information about a current minimum desired buffer size at the Se NB for transmitting to the UE user data; and the like. The X2-C may provide intra-LTE access mobility functionality, including context transfers from source to target eNBs, user plane transport control, etc.; load management functionality; as well as inter-cell interference coordination functionality.

In embodiments where the system 900 is a SG or NR system (e.g., when CN 906 is an SGC), the interface 930 may be an Xn interface. The Xn interface is defined between two or more RAN nodes (e.g., two or more aNBs and the like) that connect to SGC, between a RAN node 914 (e.g., a gNB) connecting to SOC and an eNB, and/or between two eNBs connecting to 5GC CN 906). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 922 in a connected mode (e.g., CM-CONNECTED) including functionality to manage the UE mobility for connected mode between one or more RAN node 914 or RAN node 916. The mobility support may include context transfer from an old (source) serving RAN node 914 to new (target) serving RAN node 916; and control of user plane tunnels between old (source) serving RAN node 914 to new (target) serving RAN node 916. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 908 is shown to be communicatively coupled to a core network-in this embodiment, CN 906. The CN 906 may comprise one or more network elements 932, which are configured to offer various data and telecommunications services to customers/subscribers (e.g., users of UE 922 and UE 920) who are connected to the CN 906 via the (R)AN 908. The components of the CN 906 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 906 may be referred to as a network slice, and a logical instantiation of a portion of the CN 906 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NPV systems can be used to execute virtual or reconfigurable implementations of one or more EPC components functions.

Generally, an application server 918 may be an element offering applications that use IP bearer resources with the core network (e.g., UMTS PS domain, LTE PS data services, etc.), The application server 918 can also be configured to support one or more communication services (e.g., VoIP sessions, PTT sessions, group communication sessions, social networking services, etc.) for the UE 922 and UE 920 via the EPC. The application server 918 may communicate with the CN 906 through an IP communications interface 936.

In embodiments, the CN 906 may be an SGC, and the (R)AN 116 may be connected with the CN 906 via an NG interface 934. In embodiments, the NG interface 934 may be split into two parts, an NG user plane (NG-U) interface 926, which carries traffic data between the RAN node 914 or RAN node 916 and a UPF, and the S1 control plane (NG-C) interface 928, which is a signaling interface between the RAN node 914 or RAN node 916 and AMFs.

In embodiments, the CN 906 may be a SG CN, while in other embodiments, the CN 906 may be an EPC). Where CN 906 is an EPC, the (R)AN 116 may be connected with the CN 906 via an S1 interface 934. In embodiments, the S1 interface 934 may be split into two parts, an S1 user plane (S1-U) interface 926, which carries traffic data between the RAN node 914 or RAN node 916 and the S-GW, and the S1-MME interface 928, which is a signaling interface between the RAN node 914 or RAN node 916 and MMES.

Figure 10:
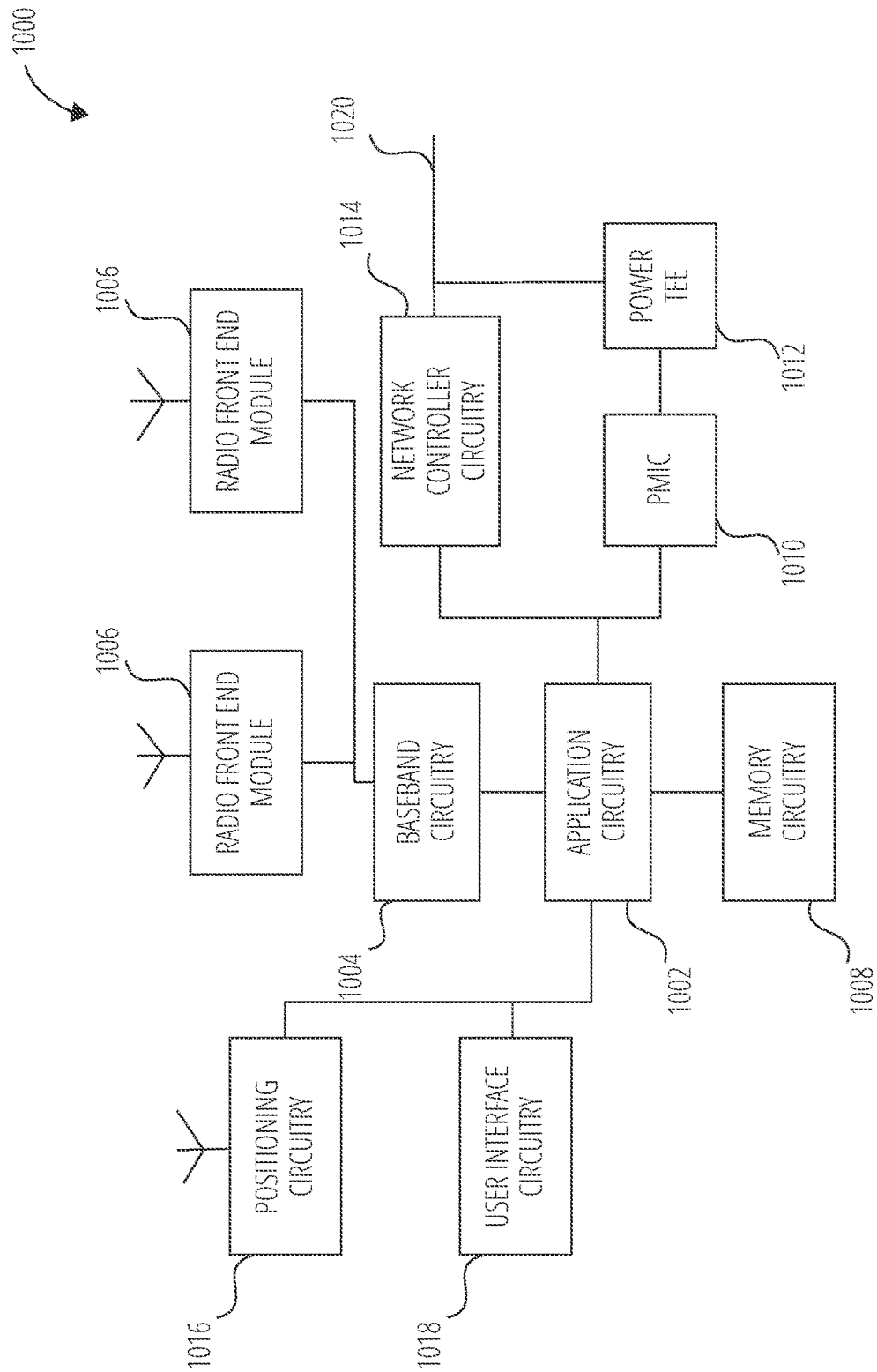
FIG. 10 illustrates an infrastructure equipment in accordance with one embodiment.

FIG. 10 illustrates an example of infrastructure equipment 1000 in accordance with various embodiments. The infrastructure equipment 1000 may be implemented as a base station, radio head, RAN node, AN, application server, and/or any other element/device discussed herein. In other examples, the infrastructure equipment 1000 could be implemented in or by a UF.

The infrastructure equipment 1000 includes application circuitry 1002, baseband circuitry 1004, one or more radio front end module 1006 (RFEM), memory circuitry 1008, power management integrated circuitry (shown as PMIC 1010), power tee circuitry 1012, network controller circuitry 1014, network interface connector 1020, satellite positioning circuitry 1016, and user interface circuitry 1018. In some embodiments, the device infrastructure equipment 1000 may include additional elements such as, for example, memory/storage, display, camera, sensor, or input/output (I/O) interface. In other embodiments, the components described below may be included in more than one device. For example, said circuitries may be separately included in more than one device for CRAN, vBRU, or other like implementations. Application circuitry 1002 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1002 may be coupled with or may include memory/storage elements and may be configured to execute instructions stored in the memory/storage to enable various applications or operating systems to run on the infrastructure equipment 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1002 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 1002 may comprise, or may be, a special-purpose processor/controller to operate according to the various embodiments herein. As examples, the processor(s) of application circuitry 1002 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2C® provided by Cavium(™), Inc.; a MIPS-based design from MIPS Technologies, Inc. such as MIPS Warrior P-class processors; and/or the like. In some embodiments, the infrastructure equipment 1000 may not utilize application circuitry 1002, and instead may include a special-purpose processor/controller to process IP data received from an EPC or 5GC, for example.

In some implementations, the application circuitry 1002 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1002 may comprise logic blocks or logic fabric, and other interconnected resources that may be programmed to perform various functions, such as the procedures, methods, functions, etc. of the various embodiments discussed herein. In such embodiments, the circuitry of application circuitry 1002 may include memory cells (e.g., erasable programmable read-only memory (EPROM), electrically erasable programmable read-only memory (EEPROM), flash memory, static memory (e.g., static random access memory(SRAM), anti-fuses, etc.)) used to store logic blocks, logic fabric, data, etc. in look-up-tables (LUTs) and the like. The baseband circuitry 1004 may be implemented, for example, as a solder-down substrate including one or more integrated circuits, a single packaged integrated circuit soldered to a main circuit board or a multi-chip module containing two or more integrated circuits.

The user interface circuitry 1018 may include one or more user interfaces designed to enable user interaction with the infrastructure equipment 1000 or peripheral component interfaces designed to enable peripheral component interaction with the infrastructure equipment 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1006 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1006, which incorporates both mmWave antennas and sub-mmWave.

The memory circuitry 1008 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory(MRAM), etc., and may incorporate the three-dimensional (3D) cross-point (XPOINT) memories from Intel® and Micron®. The memory circuitry 1008 may be implemented as one or more of solder down packaged integrated circuits, socketed memory modules and plug-in memory cards.

The PMIC 1010 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1012 may provide for electrical power drawn from a network cable to provide both power supply and data connectivity to the infrastructure equipment 1000 using a single cable.

The network controller circuitry 1014 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1000 via network interface connector 1020 using a physical connection, which may be electrical (commonly referred to as a "copper interconnect"), optical, or wireless. The network controller circuitry 1014 may include one or more dedicated processors and/or FPGAs to communicate using one or more of the aforementioned protocols. In some implementations, the network controller circuitry 1014 may include multiple controllers to provide connectivity to other networks using the same or different protocols.

The positioning circuitry 1016 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo System, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1016 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1016 may include a Micro-Technology for Positioning, Navigation, and Timing (Micro-PNT) IC that uses a master timing clock to perform position tracking/estimation without GNSS assistance. The positioning circuitry 1016 may also be part of, or interact with, the baseband circuitry 1004 and/or radio front end module 1006 to communicate with the nodes and components of the positioning network. The positioning circuitry 1016 may also provide position data and/or time data to the application circuitry 1002, which may use the data to synchronize operations with various infrastructure, or the like. The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCix), PCI express (PCie), or any number of other technologies. The bus/IX may be a proprietary bus, for example, used in a Sod; based system. Other bus/IX systems may be included, such as an I²C interface, air SPI interface, point to point interfaces, and a power bus, among others.

Figure 11:
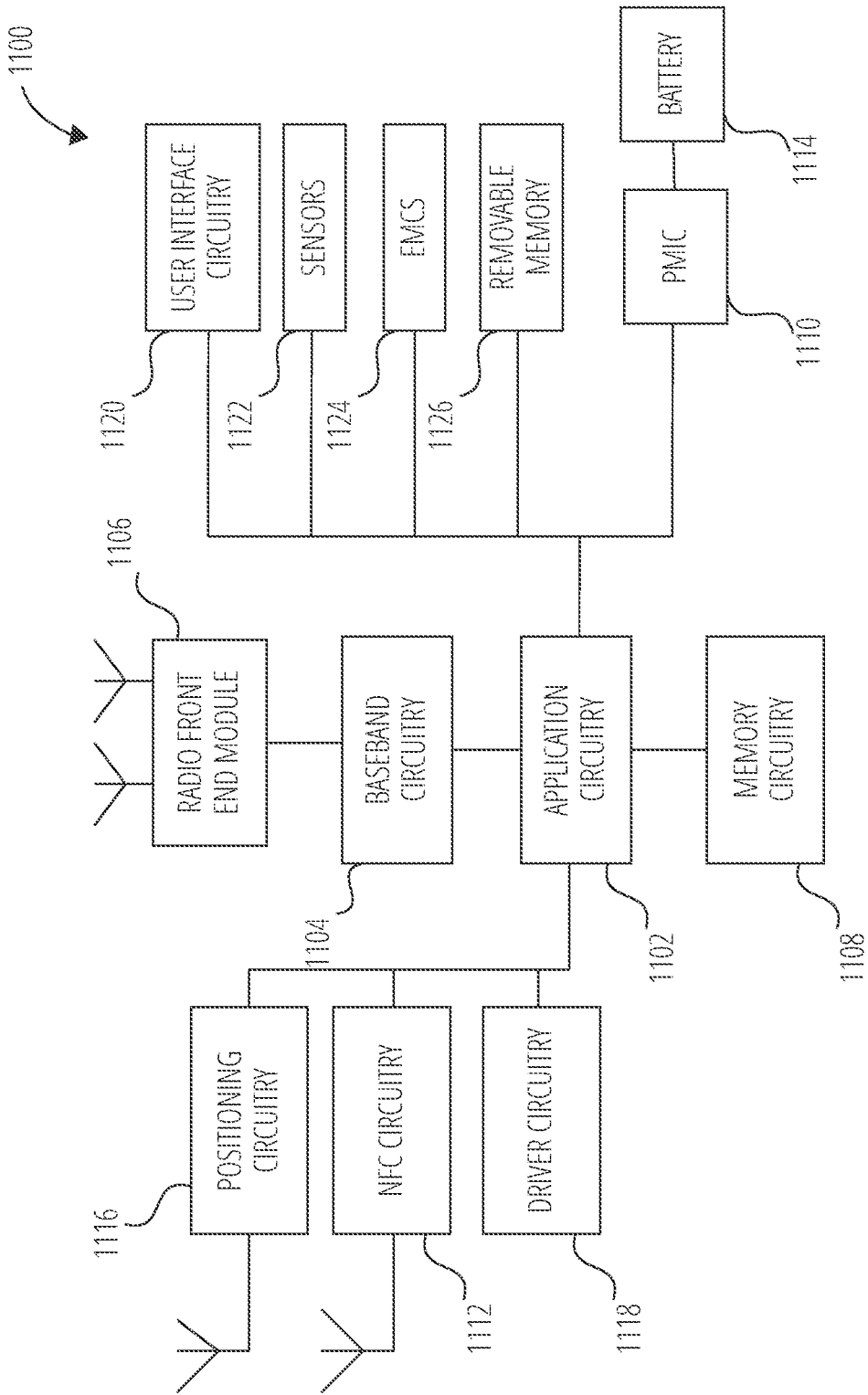
FIG. 11 illustrates a platform in accordance with one embodiment.

FIG. 11 illustrates an example of a platform 1100 in accordance with various embodiments. In embodiments, the computer platform 1100 may be suitable for use as UEs, application servers, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1102 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1102 may be coupled with or may include memory/storage elements and may be configured to execute instructions stored in the memory/storage to enable various applications or operating systems to run on the platform 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1102 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1102 may comprise, or may be, a special-purpose processor/controller to operate according to the various embodiments herein.

As examples, the processor(s) of application circuitry 1102 may include an Intel® Architecture Core™ based processor, such as a Quark™, an Atom™, an i3, i5, an i7, or an MCU-class processor, or another such processor available from Intel® Corporation. The processors of the application circuitry 1102 may also be one or more of Advanced Micro Devices (AMD) Ryzen® processor(s) or Accelerated Processing Units (APUs); AS-A9 processor(s) from Apple® Inc., Snapdragon™ processor(s) from Qualcomm® Technologies, Inc., Texas Instruments, Inc, Open Multimedia. Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 1102 may be a part of a system on a chip (SoC) in which the application circuitry 1102 and other components are formed into a single integrated circuit, or a single package, such as the Edison™ or Galileo™ SoC boards from Intel® Corporation.

Additionally or alternatively, application circuitry 1102 may include circuitry such as, but not limited to, one or more a field-programmable devices (FPDs) such as FPGAs and the like; programmable logic devices(PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 1102 may comprise logic blocks or logic fabric, and other interconnected resources that may be programmed to perform various functions, such as the procedures, methods, functions, etc. of the various embodiments discussed herein. In such embodiments, the circuitry of application circuitry 1102 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1104 may be implemented, for example, as a solder-down substrate including one or more integrated circuits, a single packaged integrated circuit soldered to a main circuit board or a multi-chip module containing two or more integrated circuits.

The radio front end module 1106 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include any number and type of memory devices used to provide for a given amount of system memory. As examples, the memory circuitry 1108 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1108 may be developed in accordance with a Joint Electron Devices Engineering Council (JEDEC) low power double data rate (LPDDR)-based design, such as LPDDR2, LPDDR3, LIPDDR4, or the like, Memory circuitry 1108 may be implemented as one or more of solder down packaged integrated circuits, single die package (SDP), dual die package (LVDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1108 may be on-die memory or registers associated with the application circuitry 1102. To provide for persistent storage of information such as data, applications, operating systems and so forth, memory circuitry 1108 may include one or more mass storage devices, which may include, inter aha, a solid state disk drive (SSDD), hard disk drive(HDD), a microHDD, resistance change memories, phase change memories, holographic memories, or chemical memories, among others. For example, the computer platform 1100 may incorporate the three-dimensional (3D) cross-point (XPOINT) memories from Intel® and Micron®.

The removable memory 1126 may include devices, circuitry, enclosures/housings, ports or receptacles, etc. used to couple portable data storage devices with the platform 1100. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1100 may also include interface circuitry (not shown) that is used to connect external devices with the platform 1100. The external devices connected to the platform 1100 via the interface circuitry include sensors 1122 and electro-mechanical components (shown as EMCs 1124), as well as removable memory devices coupled to removable memory 1126.

The sensors 1122 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1124 include devices, modules, or subsystems whose purpose is to enable platform 1100 to change its state, position, and/or orientation, or move or control a mechanism or (sub)system. Additionally, EMCs 1124 may be configured to generate and send messages/signaling to other components of the platform 1100 to indicate a current state of the EMCs 1124. Examples of the EMCs 1124 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electromechanical components. In embodiments, platform 1100 is configured to operate one or more EMCs 1124 based on one or more captured events and/or instructions or control signals received from a service provider and/or various clients. In some implementations, the interface circuitry may connect the platform 1100 with positioning circuitry 1116. The positioning circuitry 1116 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 1116 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 1116 may include a Micro-PNT IC that uses a master timing clock to perform position tracking/estimation without GLASS assistance. The positioning circuitry 1116 may also be part of, or interact with, the baseband circuitry 1104 and/or radio front end module 1106 to communicate with the nodes and components of the positioning network. The positioning circuitry 1116 may also provide position data and/or time data to the application circuitry 1102, which may use the data to synchronize operations with various infrastructure (e.g., radio base stations), for turn-by-turn navigation applications, or the like.

In some implementations, the interface circuitry may connect the platform 1100 with Near-Field Communication circuitry (shown as NFC circuitry 1112). The NFC circuitry 1112 is configured to provide contactless, short-range communications based on radio frequency identification (RFID) standards, wherein magnetic field induction is used to enable communication between NFC circuitry 1112 and NFC-enabled devices external to the platform 1100 (e.g., an "NFC touchpoint"). NFC circuitry 1112 comprises an NFC controller coupled with an antenna element and a processor coupled with the NFC controller. The NFC controller may be a chip/IC providing NFC functionalities to the NFC circuitry 1112 by executing NFC controller firmware and an NFC stack The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 1112, or initiate data transfer between the NFC circuitry 1112 and another active NFC device (e.g., a smartphone or an NFC-enabled POS terminal) that is proximate to the platform 1100.

The driver circuitry 1118 may include software and hardware elements that operate to control particular devices that are embedded in the platform 1100, attached to the platform 1100, or otherwise communicatively coupled with the platform 1100. The driver circuitry 1118 may include individual drivers allowing other components of the platform 1100 to interact with or control various input/output (I/O) devices that may be present within, or connected to, the platform 1100. For example, driver circuitry 1118 may include a display driver to control and allow access to a display device, a touchscreen driver to control and allow access to a touchscreen interface of the platform 1100, sensor drivers to obtain sensor readings of sensors 1122 and control and allow access to sensors 1122, EMC drivers to obtain actuator positions of the EMCs 1124 and/or control and allow access to the EMCs 1124, a camera driver to control and allow access to an embedded image capture device, audio drivers to control and allow access to one or more audio devices.

The power management integrated circuitry (shown as PMIC 1110) (also referred to as "power management circuitry") may manage power provided to various components of the platform 1100. In particular, with respect to the baseband circuitry 1104, the PMIC 1110 may control power-source selection, voltage scaling, battery charging, or DC-to-DC conversion. The PMIC 1110 may often be included when the platform 1100 is capable of being powered by a battery 1114, for example, when the device is included in a UE.

In some embodiments, the PMIC 1110 may control, or otherwise be part of, various power saving mechanisms of the platform 1100. For example, if the platform 1100 is in an RRC_Connected state, where it is still connected to the RAN node as it expects to receive traffic shortly, then it may enter a state known as Discontinuous Reception Mode (DRX) after a period of inactivity. During this state, the platform 1100 may power down for brief intervals of time and thus save power. If there is no data traffic activity for an extended period of time, then the platform 1100 may transition off to an RRC_Idle state, where it disconnects from the network and does not perform operations such as channel quality feedback, handover, etc. The platform 1100 goes into a very low power state and it performs paging where again it periodically wakes up to listen to the network and then powers down again. The platform 1100 may not receive data in this state; in order to receive data, it must transition hack to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1114 may power the platform 1100, although in some examples the platform 1100 may be mounted deployed in a fixed location, and may have a power supply coupled to an electrical grid. The battery 1114 may be a lithium ion battery, a metal-air battery, such as a zinc-air battery, an aluminum-air battery, a lithium-air battery, and the like. In some implementations, such as in V2X applications, the battery 1114 may be a typical lead-acid automotive battery.

In some implementations, the battery 1114 may be a "smart battery," which includes or is coupled with a Battery Management System (BMS) or battery monitoring integrated circuitry. The BMS may be included in the platform 1100 to track the state of charge (SoCh) of the battery 1114. The BMS may be used to monitor other parameters of the battery 1114 to provide failure predictions, such as the state of health (SoH) and the state of function (Son of the battery 1114. The BMS may communicate the information of the battery 1114 to the application circuitry 1102 or other components of the platform 1100. The BMS may also include an analog-to-digital (ADC) convertor that allows the application circuitry 1102 to directly monitor the voltage of the battery 1114 or the current flow from the battery 1114. The battery parameters may be used to determine actions that the platform 1100 may perform, such as transmission frequency, network operation, sensing frequency, and the like.

A power block, or other power supply coupled to an electrical grid may be coupled with the BMS to charge the battery 1114. In some examples, the power block may be replaced with a wireless power receiver to obtain the power wirelessly, for example, through a loop antenna in the computer platform 1100. In these examples, a wireless battery charging circuit may be included in the BMS. The specific charging circuits chosen may depend on the size of the battery 1114, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1120 includes various input/output (I/O) devices present within, or connected to, the platform 1100, and includes one or more user interfaces designed to enable user interaction with the platform 1100 and/or peripheral component interfaces designed to enable peripheral component interaction with the platform 1100. The user interface circuitry 1120 includes input device circuitry and output device circuitry. Input device circuitry includes any physical or virtual means for accepting an input including, inter glia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1100. The output device circuitry may also include speakers or other audio emitting devices, printer(s), and/or the like. In some embodiments, the sensors 1122 may be used as the input device circuitry (e.g., an image capture device, motion capture device, or the like) and one or more EMCs may be used as the output device circuitry (e.g., an actuator to provide haptic feedback or the like). In another example, NFC, circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1100 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

Figure 12:
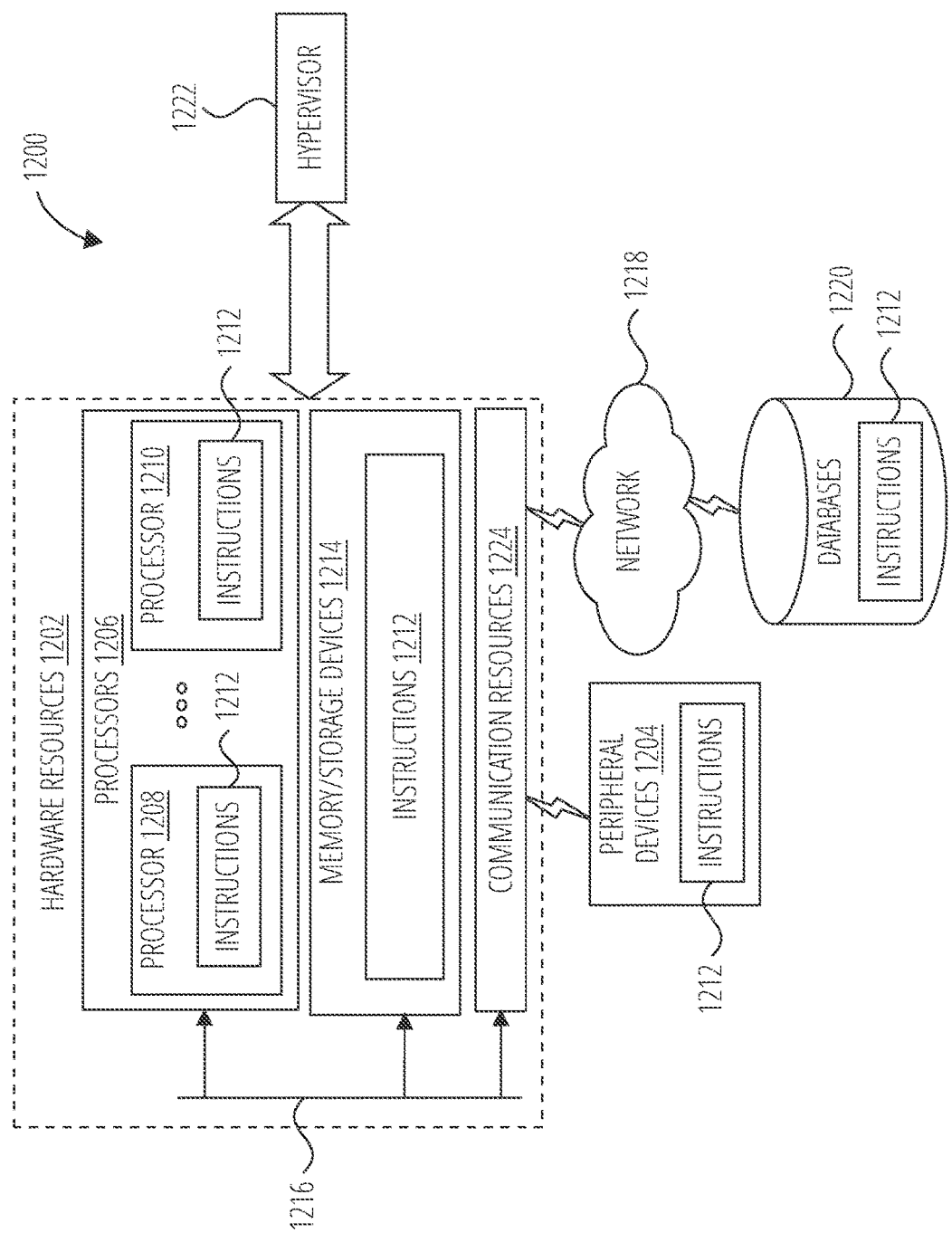
FIG. 12 illustrates components in accordance with one embodiment.

FIG. 12 is a block diagram illustrating components 1200, according to some example embodiments, able to read instructions from a machine-readable or computer-readable medium (e.g., a non-transitory machine-readable storage medium) and perform any one or more of the methodologies discussed herein. Specifically, FIG. 12 shows a diagrammatic representation of hardware resources 1202 including one or more processors 1206 (or processor cores), one or more memory/storage devices 1214, and one or more communication resources 1224, each of which may be communicatively coupled via a bus 1216. For embodiments where node virtualization (e.g., NFV) is utilized, a hypervisor 1222 may be executed to provide an execution environment for one or more network slices/sub-slices to utilize the hardware resources 1202.

The processors 1206 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RTIC), another processor, or any suitable combination thereof) may include, for example, a processor 1208 and a processor 1210.

The memory/storage devices 1214 may include main memory, disk storage, or any suitable combination thereof. The memory/storage devices 1214 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1224 may include interconnection or network interface components or other suitable devices to communicate with one or more peripheral devices 1204 or one or more databases 1220 via a network 1218. For example, the communication resources 1224 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1212 may comprise software, a program, an application, an applet, an app, or other executable code for causing at least any of the processors 1206 to perform any one or more of the methodologies discussed herein. The instructions 1212 may reside, completely or partially, within at least one of the processors 1206 (e.g., within the processor's cache memory), the memory/storage devices 1214, or any suitable combination thereof. Furthermore, any portion of the instructions 1212 may be transferred to the hardware resources 1202 from any combination of the peripheral devices 1204 or the databases 1220. Accordingly, the memory of the processors 1206, the memory/storage devices 1214, the peripheral devices 1204, and the databases 1220 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for communication by a user equipment (UE). The method includes receiving a radio frequency (RF) signal from a wireless network. The RF signal comprising M copies of a duplicated signal in a frequency domain. The method further includes processing the RF signal to obtain an analog baseband signal comprising the M copies of the duplicated signal uniformly offset from one another in the frequency domain by a bandwidth F and including a gap between adjacent copies, filtering the analog baseband signal using an anti-aliasing filter, and sampling an output of the anti-aliasing filter at a sampling frequency selected to obtain a digital baseband signal comprising a combined digital copy of the M copies of the duplicated signal folded over each other.

Example 2 includes the method of Example 1, wherein the anti-aliasing filter comprising a passband of at least M×F, and wherein the sampling frequency is M'×F, where M' is an integer smaller than M.

Example 3 includes the method of Example 1, wherein each of the M copies of the duplicated signal in the analog baseband signal comprises an occupied signal bandwidth Fs, where Fs is less than F.

Example 4 includes the method of Example 1, further comprising digital baseband processing the combined digital copy for subsequent control channel or data channel processing.

Example 5 includes the method of Example 1, wherein the analog baseband signal further comprises pilot signals, each of the pilot signals offset from a respective one of the M copies of the duplicated signal by a unique offset frequency, the method further comprising: generating an estimate of at least one of a phase difference and a gain difference between the pilot signals, and either before or after filtering the analog baseband signal using the anti-aliasing filter, based on the estimate, at least one of phase adjusting and gain adjusting one or more of the M copies of the duplicated signal to compensate for coherence loss.

Example 6 includes the method of Example 5, wherein the digital signal further includes digital versions of the pilot signals, and wherein generating the estimate comprises: processing the digital versions of the pilot signals using digital circuitry for estimating at least one of the phase difference and the gain difference; and providing feedback from the digital circuitry to phase adjustment and/or gain adjustment circuitry configured to provide the phase adjusting.

Example 7 includes the method of Example 5, wherein generating the estimate comprises: separating the pilot signals from the analog baseband signal using notch filters; processing the pilot signals using analog circuitry for estimating at least one of the phase difference and the gain difference; and providing feedback from the analog circuitry to phase adjustment circuitry configured to provide the phase adjusting.

Example 8 includes the method of Example 1, further comprising switching from sampling the output of the anti-aliasing filter at a first sampling frequency of M'×F in a first mode to a second sampling frequency of M×F in a second mode.

Example 9 includes the method of Example 8, further comprising selecting the first mode for frequency diversity to receive high reliability and moderate throughput data, and selecting the second mode for high throughput data.

Example 10 includes the method of Example 8, further comprising, to switch from the first mode to the second mode, using a first predetermined switching time for a first frequency range (FR1) and a second predetermined switching time for a second frequency range (FR2).

Example 11 includes the method of Example 8, wherein the duplicated signal comprises a physical downlink control channel (PDCCH), wherein switching from the first mode to the second mode is explicitly indicated to the UE in downlink control information (DCI) scheduling a physical downlink shared channel (PDSCH).

Example 12 includes the method of Example 8, wherein the duplicated signal comprises a physical downlink control channel (PDCCH), further comprising implicitly determining to switch from the first mode to the second mode based on a transport block size of a physical downlink shared channel (PDSCH) or an entry in a frequency domain resource allocation (FDRA) table associated with the second mode.

Example 13 includes the method of Example 8, further comprising selectively filtering the analog baseband signal to pass the M copies of the duplicated signal in the first mode and to pass one or more other signals in the second mode.

Example 14 includes the method of Example 1, wherein the duplicated signal comprises a synchronization signal block (SSB), the method further comprising conducting a cell search, by the UE, over an SSB raster only.

Example 15 includes the method of Example 1, wherein the M copies comprises at least four copies of the duplicated signal.

Example 16 is a user equipment (UE) comprising: receiver circuitry to receive a radio frequency (RF) signal from a wireless network and output an analog baseband signal, the RF signal comprising M copies of a duplicated signal in a frequency domain, the analog baseband signal comprising the M copies of the duplicated signal uniformly offset from one another in the frequency domain by a bandwidth F and including a gap between adjacent copies; an anti-aliasing analog filter to filter the analog baseband signal; and an analog to digital converter (ADC) to sample an output of the anti-aliasing analog filter at a sampling frequency selected to obtain a digital baseband signal comprising a combined digital copy of the M copies of the duplicated signal folded over each other.

Example 17 includes the UE of Example 16, wherein the anti-aliasing analog filter comprises a passband of at least M×F, and wherein the sampling frequency is M'×F in a first mode of the ADC and M×F in a second mode of the ADC.

Example 18 includes the UE of Example 17, further comprising one or more low pass filters to receive the analog baseband signal and to pass the M copies of the duplicated signal in the first mode and to pass one or more other signals in the second mode.

Example 19 includes the UE of Example 16, further comprising digital front end processing circuitry to process the digital baseband signal from the ADC.

Example 20 includes the UE of Example 16, further comprising phase adjustment circuitry to receive the analog baseband signal from the receiver circuitry and to output the analog baseband signal to anti-aliasing analog filter, the phase adjustment circuitry to phase adjust one or more of the M copies of the duplicated signal to compensate for coherence loss based on at least one of a phase estimation and a gain estimation of pilot signals offset from a respective one of the M copies of the duplicated signal by a unique offset frequency.

Example 21 includes the UE of Example 20, further comprising digital estimation circuitry to receive digital copies of the pilot signals and to provide feedback comprising at least one of the phase estimation and the gain estimation to the phase adjustment circuitry.

Example 22 includes the UE of Example 20, further comprising analog estimation circuitry to receive the analog baseband signal from the receiver circuitry and to provide feedback comprising at least one of the phase estimation and the gain estimation to the phase adjustment circuitry.

Example 23 includes the UE of Example 21, wherein the analog estimation circuitry comprises notch filters to separate the pilot signals from the analog baseband circuitry.

Example 24 is a method for a base station. The method includes generating a plurality of copies of a duplicated signal in a frequency domain, generating a radio frequency (RF) signal comprising uniform frequency offsets between the plurality of copies of the duplicated signal and including a gap between adjacent copies, and transmitting the RF signal to one or more user equipment (UE).

Example 25 includes the method of Example 24, further comprises selecting the gap based on a tradeoff between increasing a utilization of a power spectrum density (PSD) of the RF signal and reducing a complexity of an anti-aliasing filter in the one or more UE.

Example 26 includes the method of Example 24, wherein the plurality of copies comprises at least two copies of the duplicated signal.

Example 27 includes the method of Example 24, further comprising including pilot signals in the RF signal, each of the pilot signals offset from a respective one of the plurality of copies of the duplicated signal by a unique offset frequency.

Example 28 includes the method of Example 24, wherein the duplicated signal comprises a physical downlink control channel (PDCCH), and wherein the method further comprises, after transmitting the RE signal to the one or more UE, sending a downlink control information (DCI) to the one or more UE to schedule a physical downlink shared channel (PDSCH), the DCI comprising an indication to switch from a diversity mode of operation to a high throughput mode of operation.

Example 29 includes the method of Example 24, further comprising multiplexing one or more other signals with the plurality of copies of the duplicated signal in the RF signal, wherein the plurality of copies of the duplicated signal are for the one or more UE operating in a diversity mode of operation and the one or more other signals are for one or more other UEs operating in a high throughput mode of operation.

Example 30 is a user equipment, comprising means for processing each of the steps in any of Example 1 to Example 15.

Example 31 is a base station, comprising means for performing each of the steps in any of Example 24 to Example 29.

Example 32 may include an apparatus comprising means to perform one or more elements of a method described in or related to any of the above Examples, or any other method or process described herein.

Example 33 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 34 may include an apparatus comprising logic, modules, or circuitry to perform one or more elements of a method described in or related to any of the above Examples, or any other method or process described herein.

Example 35 may include a method, technique, or process as described in or related to any of the above Examples, or portions or parts thereof.

Example 36 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 37 may include a signal as described in or related to any of the above Examples, or portions or parts thereof.

Example 38 may include a datagram, packet, frame, segment, protocol data unit (PDU), or message as described in or related to any of the above Examples, or portions or parts thereof, or otherwise described in the present disclosure.

Example 39 may include a signal encoded with data as described in or related to any of the above Examples, or portions or parts thereof, or otherwise described in the present disclosure.

Example 40 may include a signal encoded with a datagram, packet, frame, segment, PDU, or message as described in or related to any of the above Examples, or portions or parts thereof, or otherwise described in the present disclosure.

Example 41 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 42 may include a computer program comprising instructions, wherein execution of the program by a processing element is to cause the processing element to carry out the method, techniques, or process as described in or related to any of the above Examples, or portions thereof.

Example 43 may include a signal in a wireless network as shown and described herein.

Example 44 may include a method of communicating in a wireless network as shown and described herein.

Example 45 may include a system for providing wireless communication as shown and described herein.

Example 46 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc, can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for communication by a user equipment (UE), the method comprising:

receiving a radio frequency (RF) signal from a wireless network, the RF signal comprising M copies of a duplicated signal in a frequency domain;

processing the RF signal to obtain an analog baseband signal comprising the M copies of the duplicated signal uniformly offset from one another in the frequency domain by a bandwidth F and including a gap between adjacent copies;

filtering the analog baseband signal using an anti-aliasing filter; and sampling an output of the anti-aliasing filter at a sampling frequency selected to obtain a digital baseband signal comprising a combined digital copy of the M copies of the duplicated signal folded over each other, wherein the anti-aliasing filter comprising a passband of at least M x F, and wherein a first sampling frequency is M'×F, where M' is an integer smaller than M.

2. The method of claim 1, wherein each of the M copies of the duplicated signal in the analog baseband signal comprises an occupied signal bandwidth Fs, where Fs is less than F.

3. The method of claim 1, further comprising digital baseband processing the combined digital copy for subsequent control channel or data channel processing.

4. The method of claim 1, wherein the analog baseband signal further comprises pilot signals, each of the pilot signals offset from a respective one of the M copies of the duplicated signal by a unique offset frequency, the method further comprising:

generating an estimate of at least one of a phase difference and a gain difference between the pilot signals; and either before or after filtering the analog baseband signal using the anti-aliasing filter, based on the estimate, at least one of phase adjusting and gain adjusting one or more of the M copies of the duplicated signal to compensate for coherence loss.

5. The method of claim 4, wherein the digital signal further includes digital versions of the pilot signals, and wherein generating the estimate comprises:

processing the digital versions of the pilot signals using digital circuitry for estimating at least one of the phase difference and the gain difference; and providing feedback from the digital circuitry to phase adjustment and/or gain adjustment circuitry configured to provide the phase adjusting.

6. The method of claim 4, wherein generating the estimate comprises:

separating the pilot signals from the analog baseband signal using notch filters;

processing the pilot signals using analog circuitry for estimating at least one of the phase difference and the gain difference; and providing feedback from the analog circuitry to phase adjustment circuitry configured to provide the phase adjusting.

7. The method of claim 1, further comprising switching from sampling the output of the anti-aliasing filter at the first sampling frequency of M' x F in a first mode to a second sampling frequency of M x F in a second mode.

8. The method of claim 7, further comprising selecting the first mode for frequency diversity to receive high reliability and moderate throughput data, and selecting the second mode for high throughput data.

9. The method of claim 7, further comprising, to switch from the first mode to the second mode, using a first predetermined switching time for a first frequency range (FR1) and a second predetermined switching time for a second frequency range (FR2).

10. The method of claim 7, wherein the duplicated signal comprises a physical downlink control channel (PDCCH), wherein switching from the first mode to the second mode is explicitly indicated to the UE in downlink control information (DCI) scheduling a physical downlink shared channel (PDSCH).

11. The method of claim 7, wherein the duplicated signal comprises a physical downlink control channel (PDCCH), further comprising implicitly determining to switch from the first mode to the second mode based on a transport block size of a physical downlink shared channel (PDSCH) or an entry in a frequency domain resource allocation (FDRA) table associated with the second mode.

12. The method of claim 7, further comprising selectively filtering the analog baseband signal to pass the M copies of the duplicated signal in the first mode and to pass one or more other signals in the second mode.

13. The method of claim 1, wherein the duplicated signal comprises a synchronization signal block (SSB), the method further comprising conducting a cell search, by the UE, over an SSB raster only.

14. The method of claim 1, wherein the M copies comprises at least four copies of the duplicated signal.

15. A user equipment (UE) comprising:
receiver circuitry to receive a radio frequency (RF) signal from a wireless network and output an analog baseband signal, the RF signal comprising M copies of a duplicated signal in a frequency domain, the analog baseband signal comprising the M copies of the duplicated signal uniformly offset from one another in the frequency domain by a bandwidth F and including a gap between adjacent copies;
an anti-aliasing analog filter to filter the analog baseband signal; and
an analog to digital converter (ADC) to sample an output of the anti-aliasing analog filter at a sampling frequency selected to obtain a digital baseband signal comprising a combined digital copy of the M copies of the duplicated signal folded over each other, wherein the anti-aliasing analog filter comprises a passband of at least M x F, and wherein the sampling frequency is M'×F in a first mode of the ADC and M×F in a second mode of the ADC.

16. The UE of claim 15, further comprising one or more low pass filters to receive the analog baseband signal and to pass the M copies of the duplicated signal in the first mode and to pass one or more other signals in the second mode.

17. The UE of claim 15, further comprising digital front end processing circuitry to process the digital baseband signal from the ADC.

18. The UE of claim 15, further comprising phase adjustment circuitry to receive the analog baseband signal from the receiver circuitry and to output the analog baseband signal to anti-aliasing analog filter, the phase adjustment circuitry to phase adjust one or more of the M copies of the duplicated signal to compensate for coherence loss based on at least one of a phase estimation and a gain estimation of pilot signals offset from a respective one of the M copies of the duplicated signal by a unique offset frequency.

* * * * *